US012550906B2

(12) United States Patent
Barnett et al.

(10) Patent No.: US 12,550,906 B2
(45) Date of Patent: Feb. 17, 2026

(54) APPARATUS AND METHOD FOR GRADING, BATCHING AND SELECTIVELY TRANSFERRING FOOD PARTS

(71) Applicant: Baader Poultry Holding GmbH, Lübeck (DE)

(72) Inventors: Douglas Bryan Barnett, Olathe, KS (US); Ryan John Foltz, Bucyrus, KS (US); Ryan Wesley O'Dell, Weatherby Lake, MO (US)

(73) Assignee: Baader Poultry Holding GmbH, Lübeck (DE)

( * ) Notice: Subject to any disclaimer, the term of this patent is extended or adjusted under 35 U.S.C. 154(b) by 899 days.

(21) Appl. No.: 17/637,139

(22) PCT Filed: Aug. 20, 2020

(86) PCT No.: PCT/US2020/047153
§ 371 (c)(1),
(2) Date: Feb. 22, 2022

(87) PCT Pub. No.: WO2021/035025
PCT Pub. Date: Feb. 25, 2021

(65) Prior Publication Data
US 2022/0279803 A1    Sep. 8, 2022

Related U.S. Application Data

(60) Provisional application No. 62/966,008, filed on Jan. 26, 2020, provisional application No. 62/889,452, filed on Aug. 20, 2019.

(51) Int. Cl.
*G06F 7/00* (2006.01)
*A22C 17/00* (2006.01)
(Continued)

(52) U.S. Cl.
CPC ........ *A22C 17/0093* (2013.01); *B65G 47/905* (2013.01); *G01G 19/387* (2013.01)

(58) Field of Classification Search
CPC . A22C 17/0093; A22C 17/002; A22C 17/008; A22C 21/0053; A22C 25/04–08;
(Continued)

(56) References Cited

U.S. PATENT DOCUMENTS 3,006,457 A * 10/1961 Weiss .................. B65G 47/766
                                                    198/367
4,527,937 A *  7/1985 Tomasello, Jr. ......... B65G 1/08
                                                    414/273
(Continued)

FOREIGN PATENT DOCUMENTS

CN    1126978 A     7/1996
CN    108883438 A   11/2018
(Continued)

OTHER PUBLICATIONS

International Search Report dated Mar. 1, 2021; International Application PCT/US2020/047153.

*Primary Examiner* — Yolanda R Cumbess
(74) *Attorney, Agent, or Firm* — Dinsmore & Shohl LLP

(57) ABSTRACT

An apparatus for grading/batching food parts includes a scale unit with a first predetermined precision, a plurality of batch bins to receive food parts, a weighing station to weigh food parts, which have not yet been transferred into the bins, with a second predetermined precision greater than the first predetermined precision and to associate the determined weights with the corresponding food part, a plurality of controllable second transfer units to selectively transfer particular ones of said food parts, which have been weighed into a selected one of the bins, and a control unit connected with the scale unit, weighing station, and first and second transfer units. The control unit controls the first and second (Continued)

transfer unit to assemble in the bins food parts so the total weight in each bin corresponds to a predetermined target weight. A method for grading/batching, and an apparatus/method for transferring food parts is also provided.

31 Claims, 22 Drawing Sheets

(51) Int. Cl.
  *B65G 47/90* (2006.01)
  *G01G 19/387* (2006.01)
(58) Field of Classification Search
  CPC .. A22C 29/005; A22C 29/023; B65G 47/905; B65G 37/00; B65G 33/02; B65G 47/02–47/04; B65G 47/08; B65G 47/16–2445; B65G 47/26–261; B65G 47/266–34; B65G 47/44–482; B65G 47/50; B65G 47/52; B65G 47/681–682; B65G 47/69–766; B65G 47/82–841; B65G 47/00; B65G 53/4658; B65G 53/48; B65G 33/00; B65G 2201/02–0223; B65G 2203/02–0208; B65G 2203/0241; B65G 2209/02; B65G 37/005; B65G 47/844; B65G 47/845; B65G 47/846; G01G 19/387; G01G 13/00; G01G 19/00; G01G 19/40–413; G01G 19/414; B07C 5/16; B07C 1/10; B07C 1/14; B07C 1/16; B07C 3/00; B07C 3/06; B07C 5/00; B07C 5/04; B07C 5/34; B07C 5/36

USPC .......................................... 700/213, 223, 230
See application file for complete search history.

(56) References Cited

U.S. PATENT DOCUMENTS

| | | | |
|---|---|---|---|
| 5,452,786 A * | 9/1995 | Gilmore | B65G 47/766 198/367 |
| 5,937,080 A | 8/1999 | Vogeley, Jr. et al. | |
| 6,580,038 B1 * | 6/2003 | Mooney | G01G 19/035 209/592 |
| 2002/0084173 A1 * | 7/2002 | Paquette | B65G 43/10 198/781.06 |
| 2006/0151289 A1 | 7/2006 | Kennedy | |
| 2006/0162970 A1 * | 7/2006 | Gudjonsson | B07C 5/16 177/121 |
| 2011/0105001 A1 | 5/2011 | Van Den Nieuwelaar et al. | |
| 2018/0003544 A1 | 1/2018 | Skraedderdal et al. | |
| 2019/0283084 A1 * | 9/2019 | Foltz | B07C 5/18 |

FOREIGN PATENT DOCUMENTS

| | | | | |
|---|---|---|---|---|
| CN | 109475133 A | * | 3/2019 | ............ A22C 25/08 |
| EP | 2084968 A1 | | 8/2009 | |
| EP | 2084968 B1 | * | 5/2011 | ............ B65G 47/46 |
| WO | 2004090481 A1 | | 10/2004 | |
| WO | 2005008192 A1 | | 1/2005 | |
| WO | WO-2009035391 A1 | * | 3/2009 | ......... B65G 47/5131 |
| WO | WO-2011012802 A1 | * | 2/2011 | ......... B65G 47/5131 |
| WO | 2013190297 A1 | | 12/2013 | |
| WO | 2014075731 A1 | | 5/2014 | |

* cited by examiner

APPARATUS AND METHOD FOR GRADING, BATCHING AND SELECTIVELY TRANSFERRING FOOD PARTS

CROSS-REFERENCE TO RELATED APPLICATIONS

This application is the U.S. National Stage of PCT/US2020/047153 filed Aug. 20, 2020, which claims priority to U.S. Provisional Patent Application No. 62/889,452 filed Aug. 20, 2019, and U.S. Provisional Patent Application No. 62/966,008 filed Jan. 26, 2020 the contents of both are incorporated herein by reference in their entirety.

FIELD OF THE INVENTION

The present invention relates to an apparatus and method for grading and batching of food parts. In addition, the invention relates to an apparatus and method for selectively transferring food parts.

BACKGROUND OF THE INVENTION

The rapid processing of food items creates handling challenges. For example, the large-scale processing of animals for consumption involves removal of tissues from the animal in preparation for batching the food parts for delivery to a customer or a consumer. The batching of food parts involves gathering food parts of particular grade characteristics into a group. Characteristics include food part type, size, and weight. For example, a batch may be one or more food parts with a specific approximate weight, or a batch may be a plurality of food parts of a specific type, such as poultry breast, gathered together totaling an approximate weight. Creating a group of food parts that have the characteristics desired by the customer or consumer maximizes the resultant batch yield and minimizes product giveaway associated with the resulting batch.

Document WO 2004/090481 A1 discloses a system for producing batches of items of predetermined weight. Such systems based on grader-type weighing machines are used for building up a number of packages in parallel. The items are weighed one by one and, subsequently, a decision will be taken at which position each item should be routed. The decision is based on historical data from previously weighed items and statistical further rules. When the process of batching items belonging to one package is completed, the items are removed from the respective position and a process of building-up a new package at the same position is initiated.

The apparatuses and methods known from the prior art therefore have the disadvantage that all items are dynamically weighed. The accuracy of such dynamic weighing process is comparatively low. Particularly, with increasing throughput rate, i.e. high conveying velocity, the inaccuracy of the weight determination also increases. This often results in major deviations from the desired target weights of the items assembled in the batches. A further disadvantage arises from the fact that the items are distributed using constructionally simply built deflector wings. On the one hand the operational speed of those deflector wings is relatively low and on the other hand they do not allow precise positioning of the items.

SUMMARY OF THE INVENTION

It is an object of the present invention to provide an apparatus and a method for grading and batching of food parts, which can be operated with high processing speed, i.e. with increased through put rate, together with high accuracy regarding the desired target weight of each batch. Furthermore, it is object of the present invention to provide an apparatus and a method for selectively transferring food parts.

The object is achieved by the apparatus referred to hereinbefore, the apparatus comprising: a scale unit adapted to determine the weights of each food part with a first predetermined precision and to associate each of the determined weights with the corresponding food part; a plurality of batch bins adapted to receive a set of selected food parts; wherein each batch bin is associated with a controllable first transfer unit adapted to selectively transfer particular ones of said food parts into a selected one of said batch bins; a weighing station adapted to, preferably statically, weigh food parts, which have not yet been transferred into said batch bins, with a second predetermined precision being greater than the first predetermined precision and to associate each of the determined weights with the corresponding food part; a plurality of controllable second transfer units, wherein each batch bin is associated with said controllable second transfer unit adapted to selectively transfer particular ones of said food parts, which have been weighed into a selected one of said batch bins; a control unit operatively connected with said scale unit, said weighing station, said first transfer unit and said second transfer unit, wherein said control unit is adapted to control said first transfer unit and said second transfer unit in order to assemble in each of said bins a plurality of said food parts to such an extent that the total weight of said food parts collected in each of said batch bins corresponds to a predetermined target weight.

Thus, according to the present invention, using both the scale unit and the weighing station adapted to weigh food parts, a high processing speed is achieved and the deviation of the total weight of the items in a batch is minimised. In other words, the batching and grading apparatus according to the present invention is adapted for hybrid batching. Hybrid batching means that in a first step the items are weighed using a scale having a lower accuracy/precision. Based on this weight determination the items are distributed to the respective bins.

When the total weight of a batch gets closer to the desired target weight, those items are distributed to the respective bins which have been weighed with the weighing station having a greater precision compared to the scale unit. Thus, the advantages of the scale unit on the one hand, namely being equipped for fast weight determination, and the weighing station, which is equipped to measure the weight of the items with higher precision on the other hand, are synergistically combined. Preferably, the scale unit comprises a hopper scale, but it should be understood that the present invention is not only restricted to such hopper scales.

According to an advantageous development of the invention, the apparatus further comprises at least a first conveyor adapted to sequentially transport the food parts in a direction of conveyance and a discharge conveyor adapted to sequentially transport the weighed food parts from said weighing station to a plurality of controllable second transfer units, wherein it is provided that said scale unit is adapted to determine the weights of each food part transported with said first conveyor, said first transfer unit is adapted to selectively transfer said particular food parts from said first conveyor into said selected one of batch bins, said weighing station being positioned downstream of the first conveyor, and said second transfer unit is adapted to selectively transfer said particular food parts from said discharge conveyor into a selected one of said batch bins.

Advantageously, a high throughput rate can be achieved without any disadvantage with regard to the precision achieving the target weight of each batch. As mentioned previously, the items are weighed while being transported, for example by the scale unit equipped as a hopper scale.

A preferred development of the invention is characterised in that said weighing station comprises a static scale and a pivoted first guide and a pivoted second guide, wherein said first guide is operably controlled by a first actuator and said second guide is operably controlled by a second actuator and wherein said first guide is adapted to controllably move food parts supplied by said first conveyor onto said scale and the second guide is adapted to controllably move said food parts from said scale onto said discharge conveyor after weighing.

This offers the advantage that the movement of the food part can be stopped, at least for a short time interval, in order to carry out a static weight measurement with greatest possible accuracy, thus minimizing any measurement errors. By this means, it is possible to stop any movement of the item to be measured only for a period of time, which is absolutely necessary for the weight measurement. Immediately after accomplishment of the weight determination, the food part is directed to the discharge conveyor with the second guide.

According to a further advantageous embodiment of the invention, said static scale comprises a deck operably connected to a weight sensing apparatus, and said deck is surrounded by a platform. Advantageously, it is ensured that the food items are safely guided onto the deck for conducting the aforesaid weighing on the one hand and that the food items are reliably guided from the deck via the surrounding platform to the discharge conveyor.

A further preferred embodiment of the invention provides that said first guide and said second guide are formed to have a reverse L-shaped plan formation. This ensures that the food parts are reliably guided, even at high operating speed or affecting acceleration forces.

According to an advantageous development of the invention, said first guide and said second guide have a curvilinear form. In other words, the first and second guides each have a smoothly curved progression.

A preferred development of the invention is characterised in that said first guide and/or said second guide has a body extending from a base formed at a proximal end to a pocket formed at a distal end. The pocket constitutes a receptable area in which the food part is securely guided during movement of the first or second guide, respectively. Safely guided movement of the food parts is thus always ensured.

According to a further advantageous embodiment of the invention, said body forms a vertical wall extending between a top edge and a bottom edge forming a first front face extending between said base and said pocket formed at said distal end. The vertical wall constitutes a contact surface for the food parts.

A further preferred embodiment of the invention provides that said pocket forms a concave second front face extending from said first front face to a projecting edge at a tip region. Advantageously, with the concave second front it is achieved that the food part to be moved is always self-centred and therefore always accurately and precisely guided by the respective guiding means, namely said first and second guides.

According to a further advantageous embodiment of the invention, a lower edge forms a lip extending from said base to said projecting edge and a groove being adapted to lift said food part supplied by said first conveyor off of the surface.

This will have the advantage to be able to move the food parts not only in a plane, e.g. carrying out only two-dimensional movements, but rather have the ability to move the food parts in a third dimension, thereby leaving the aforesaid plane in order to move the food parts to another parallel positioned plan. Thus, the apparatus of the present invention is adapted to not only move the food parts horizontally, but is also designed to move the food parts in vertical direction.

According to an advantageous development of the invention, said first guide and said second guide are adapted to be independently elevated and lowered. The above-mentioned advantages also hold for the aforesaid feature.

A preferred embodiment of the invention is characterised in that said first guide and said second guide each comprise a leading arm which has a body extending from a base at a proximal end to a projecting edge at a tip region at a distal end forming a pocket therebetween and a trailing arm which has a body extending from a base at a proximal end to a projecting edge at a distal end, with a pocket formed therebetween.

According to a further advantageous embodiment of the invention, said pocket of said trailing arm and said pocket of said leading arm form a capture zone for said food part. Advantageously, the capture zone, which forms a receptable are for the food part, securely guides the food part to be moved.

A further preferred embodiment of the invention provides that said first guide is adapted to controllably move food parts supplied by said first conveyor onto said scale by rotating said first guide, and said second guide is adapted to controllably move said food parts from said scale onto said discharge conveyor by rotating said second guide. In an advantageous manner, by rotating the first and second guides, the guides can be operated with high operation speeds. Especially in combination with the lightweight material the guides are preferably made from resulting in low moment of inertia, short transition times to move the food parts are achieved.

According to a further advantageous embodiment of the invention, the direction of rotation of said first guide is in accordance with the direction of conveyance of said food parts supplied by said first conveyor and/or a direction of rotation of said second guide is in accordance with a direction of conveyance of said food parts transported by said discharge conveyor. Advantageously, the rotation of the respective guides is always the same as the direction of conveyance. Thus, the difference between the velocity of the food parts on the respective conveyor and the instantaneous velocity of the respective guide is minimised. In case both directions of conveyance are orientated in the same direction, the directions of rotations are counter-rotating. Otherwise, the directions of rotations are the same.

The object is also achieved by the apparatus referred to hereinbefore, the apparatus comprising at least a deck and a pivoted first guide and a pivoted second guide, wherein said first guide is operably controlled by a first actuator and said second guide is operably controlled by a second actuator and wherein said first guide is adapted to controllably move food parts onto said deck and the second guide is adapted to controllably move said food parts from said deck for discharging. According to the present invention, it is possible to transfer the food parts reliably in short time.

A further preferred embodiment of the invention provides that said first guide and said second guide are formed to have a reverse L-shaped plan formation. The associated advantages have been previously described, so that we refer to the aforesaid text passage.

According to an advantageous development of the invention, said first guide and said second guide have a curvilinear form. The associated advantages have been previously described, so that we refer to the aforesaid text passage.

A preferred development of the invention is characterised in that said first guide and/or said second guide has a body extending from a base formed at a proximal end to a pocket formed at a distal end. The associated advantages have been previously described, so that we refer to the aforesaid text passage.

According to a further advantageous embodiment of the invention, said body forms a vertical wall extending between a top edge and a bottom edge forming a first front face extending between said base and said pocket formed at said distal end. The associated advantages have been previously described, so that we refer to the aforesaid text passage.

A further preferred embodiment of the invention provides that said pocket forms a concave second front face extending from said first front face to a projecting edge at a tip region. The associated advantages have been previously described, so that we refer to the aforesaid text passage.

According to a further advantageous embodiment of the invention, a lower edge forms a lip extending from said base to said projecting edge and a groove being adapted to lift said food part supplied by said first conveyor off of the surface. The associated advantages have been previously described, so that we refer to the aforesaid text passage.

A preferred development of the invention is characterised in that said first guide and said second guide are adapted to controllably move vertically with respect to said platform. The associated advantages have been previously described, so that we refer to the aforesaid text passage.

According to an advantageous development of the invention, said first guide and said second guide are adapted to be independently elevated and lowered. The associated advantages have been previously described, so that we refer to the aforesaid text passage.

A preferred embodiment of the invention is characterised in that said first guide and said second guide each comprises a leading arm which has a body extending from a base at a proximal end to a projecting edge at a tip region at a distal end forming a pocket therebetween, and a trailing arm which has a body extending from a base at a proximal end to a projecting edge at a distal end, with a pocket formed therebetween. The associated advantages have been previously described, so that we refer to the aforesaid text passage.

According to a further advantageous embodiment of the invention, said pocket of said trailing arm and said pocket of said leading arm form a capture zone for said food part. The associated advantages have been previously described, so that we refer to the aforesaid text passage.

A further preferred embodiment of the invention provides that said first guide is adapted to controllably move food parts supplied by said first conveyor onto said scale by rotating said first guide, and said second guide is adapted to controllably move said food parts from said scale onto said discharge conveyor by rotating said second guide. The associated advantages have been previously described, so that we refer to the aforesaid text passage.

In addition, the object is also achieved by the method referred to hereinbefore, the method comprising the steps of determining the weights of each food part with a scale unit having a first predetermined precision and associating each of the determined weights with the corresponding food part; receiving a set of selected food parts with a plurality of batch bins; selectively transfer particular ones of said food parts into a selected one of said batch bins via controllable first transfer units, each of which are associated with one of said batch bins; weighing said food parts, preferably statically weighing said food parts, which have not yet been transferred into said batch bins, with a second predetermined precision being greater than the first predetermined precision and associating each of the determined weights with the corresponding food part with a weighing station; selectively transferring particular ones of said food parts, which have been weighed into a selected one of said batch bins with a plurality of controllable second transfer units, each of which are associated with one of said batch bin; controlling said first transfer unit and said second transfer unit in order to assemble in each of said bins a plurality of said food parts to such an extent that the total weight of said food parts collected in each of said batch bins corresponds to a predetermined target weight.

A preferred development of the method is characterised in that the method further comprises the steps of sequentially transporting said food parts in a direction of conveyance with at least a first conveyor and sequentially transporting the weighed food parts from said weighing station to a plurality of controllable second transfer units with a discharge conveyor and is characterised in determining the weights of each food part transported with said first conveyor with said scale unit, selectively transferring said particular food parts from said first conveyor into said selected ones of batch bins with said first transfer unit, wherein said weighing station is positioned downstream of the first conveyor, and selectively transferring said particular food parts from said discharge conveyor into a selected one of said batch bins with said second transfer unit.

According to an advantageous development of the invention, the method is characterised by operably controlling a pivoted first guide by a first actuator to controllably move food parts supplied by said first conveyor onto said scale and operably controlling a pivoted second guide by a second actuator and to controllably move said food parts from said scale onto said discharge conveyor after weighing.

A preferred embodiment of the method is characterised in that the direction of rotation of said first guide is in accordance with a direction of conveyance of said food parts supplied by said first conveyor.

A preferred embodiment of the method is characterised in that said first guide and said second guide controllably move vertically with respect to a platform.

According to an advantageous embodiment of the invention, the method is characterised in that said first guide and said second guide are independently elevated and lowered.

According to an advantageous embodiment of the invention, the method is characterised in that said first guide is adapted to controllably move food parts supplied by said first conveyor onto said scale by rotating said first guide and said second guide is adapted to controllably move said food parts from said scale onto said discharge conveyor by rotating said second guide.

A preferred embodiment of the method is characterised in that the direction of rotation of said first guide is in accordance with a direction of conveyance of said food parts supplied by said first conveyor and/or a direction of rotation of said second guide is in accordance with a direction of conveyance of said food parts transported by said discharge conveyor.

To avoid repetition, reference is made with regard to the advantages arising from the inventive method to the relevant passages in connection with the apparatus according to the invention.

BRIEF DESCRIPTION OF THE DRAWINGS

Further preferred and/or expedient features and embodiments of the invention emerge from the description. Especially preferred embodiments are explained in greater detail with reference to the attached drawing. The drawing shows.

DETAILED DESCRIPTION OF THE INVENTION

Figure 1:
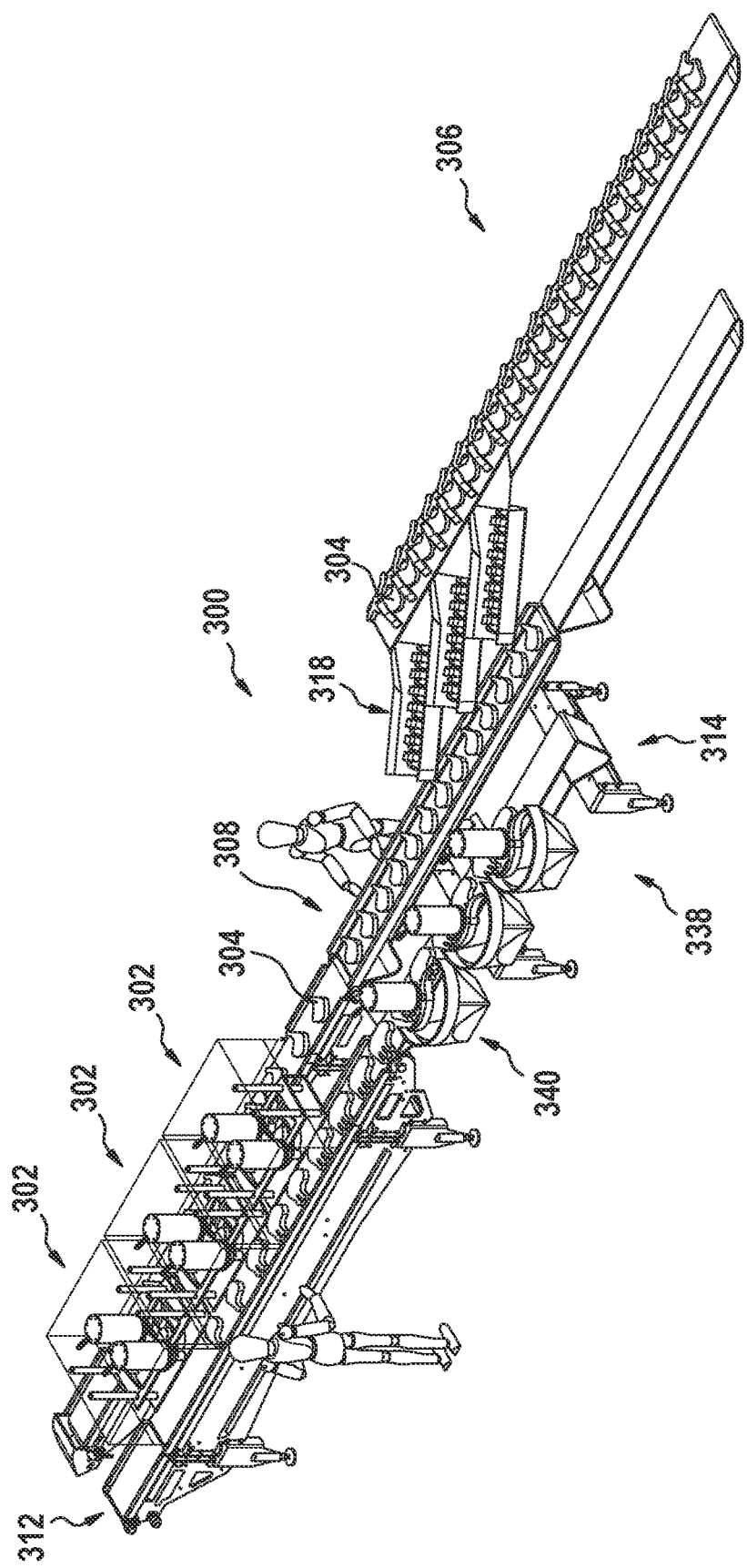
FIG. 1 is a perspective view of an embodiment of the food processing system of the disclosed subject matter.

The disclosed subject matter pertains to a food processing apparatus and method, in particular, weighed grading and batching of food parts 304. Food parts 304 include tissues harvested from animals including, but not limited to, fish, crustacean, poultry, pork, and beef. The harvested tissues are weighed and batched for shipment to a customer for sale to a consumer.

The disclosed subject matter is directed to a system 300 and method of weighing food parts 304 and processing weighed food parts 304. In an implementation the system 300, under the control of a programmable logic controller (PLC), food parts are fed to a weighing station 302 and a primer batch 338 station. The PLC tracks the location of each weighted food part 304 within the system 300 and coordinates movement of each singulated food part 304 to a desired primer batch 338.

Food parts 304 are harvested from an animal, such as poultry, and are transported through the processing system 300 controlled by a PLC by a series of conveyors with belts. The system 300 includes steps performed by apparatuses. At a transportation step harvested food parts 304 are transported by an infeed conveying system, such as a first conveyor 306 to a grading step. The grading step involves statically weighing the food part 304 at a weighing station 302. After the grading step, the weighed food parts 304 are moved to a batching step.

In an embodiment, each weighing station 302 includes a force sensor, such as a load cell, for statically weighing the food part 304. Referring to FIG. 1, in an implementation, at a distribution step the first conveyor 306 feeds one or more augers 318 that distribute food parts 304 onto a second conveyor 308. The PLC controls movement of the first conveyor 306 and movement of the augers 318 to singulate and distribute the food parts 304 onto the second conveyor 308 whereby the food parts 304 are densely populated (e.g. tightly spaced). In an embodiment, the transition between the augur 318 and second conveyor 308 includes a gate or optical eye that detects passage of a food part 304, and the movement is recorded by the PLC. Tightly spaced food parts 304 maximize the throughput of the food processing system 300. From the second conveyor 308 the food parts move to a third conveyor 310.

The third conveyor 310 moves the food parts 304 from the second conveyor 308 to one or more weighing stations 302. In an embodiment, the second conveyor 308 remains full of food parts 304, for example, there are no open spaces between food parts 304 where a food part 304 could fit without touching an adjacent food part 304. Each weighing station 302 grades a food part 304 whereby the food part 304 is weighed, and the PLC records the weight of the weighed food part 304 and determines the destination of the weighed food part 304, in particular, the location of the resulting primer batch 338 to deposit the food part 304 to create a finished batch.

Figure 2:
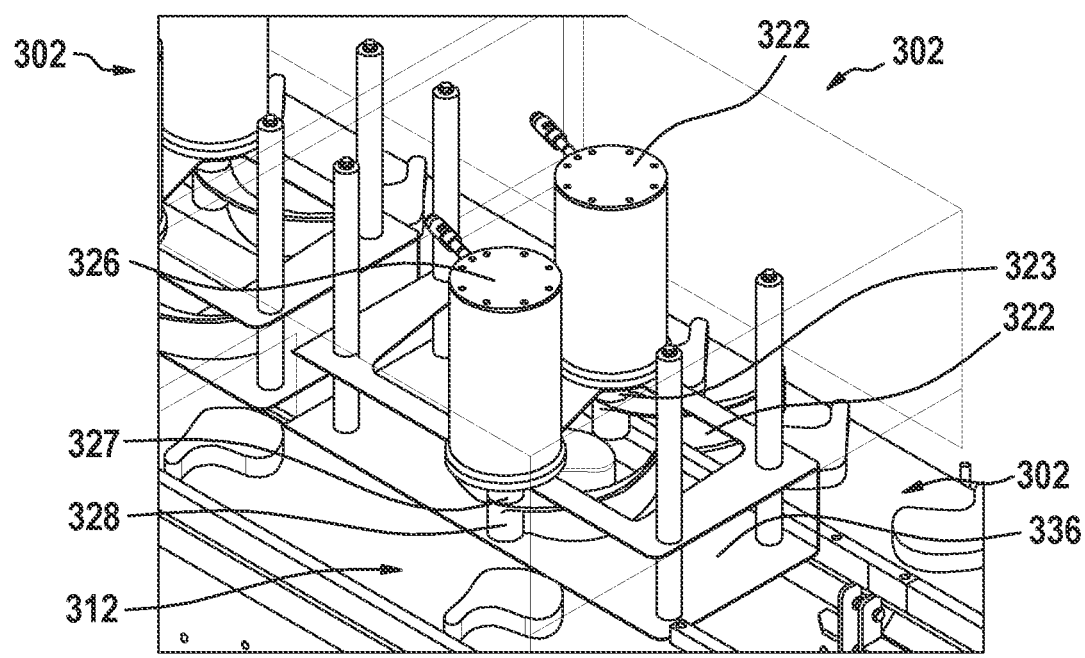
FIG. 2 is an enlarged perspective view of the weighing stations of the disclosed subject matter.
Figure 3:
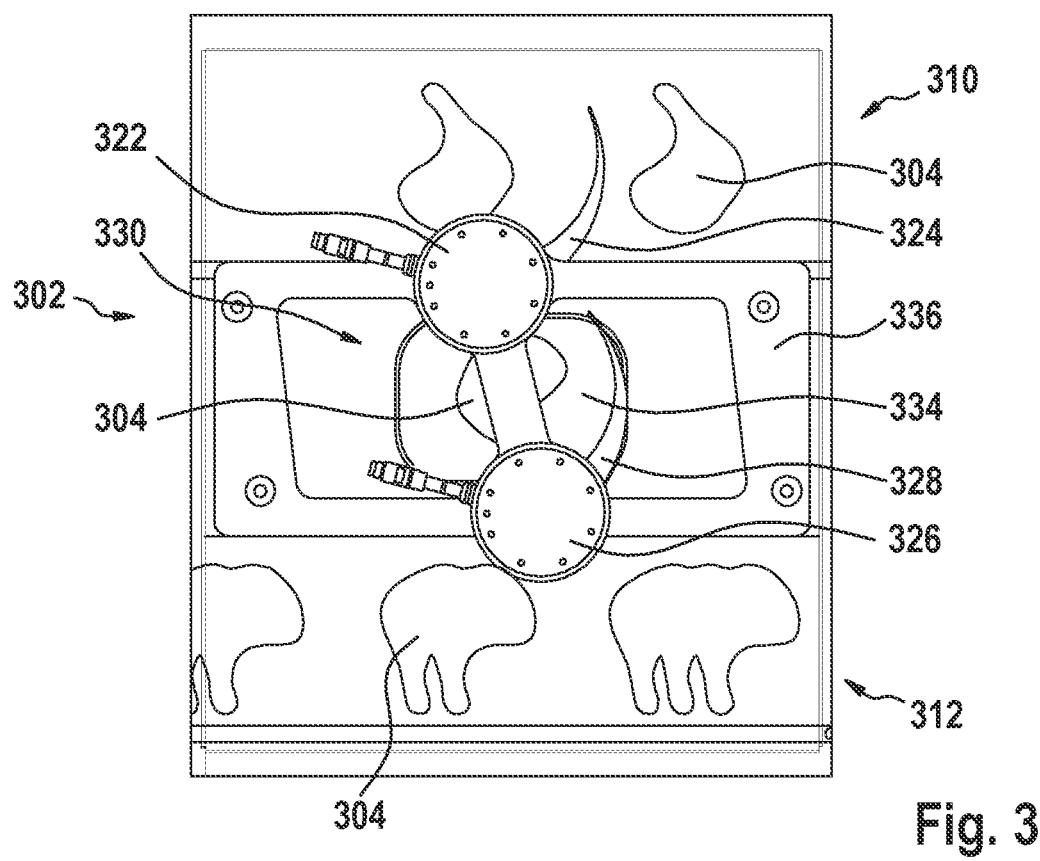
FIG. 3 is a top plan view of the weighing stations of the disclosed subject matter.
Figure 4:
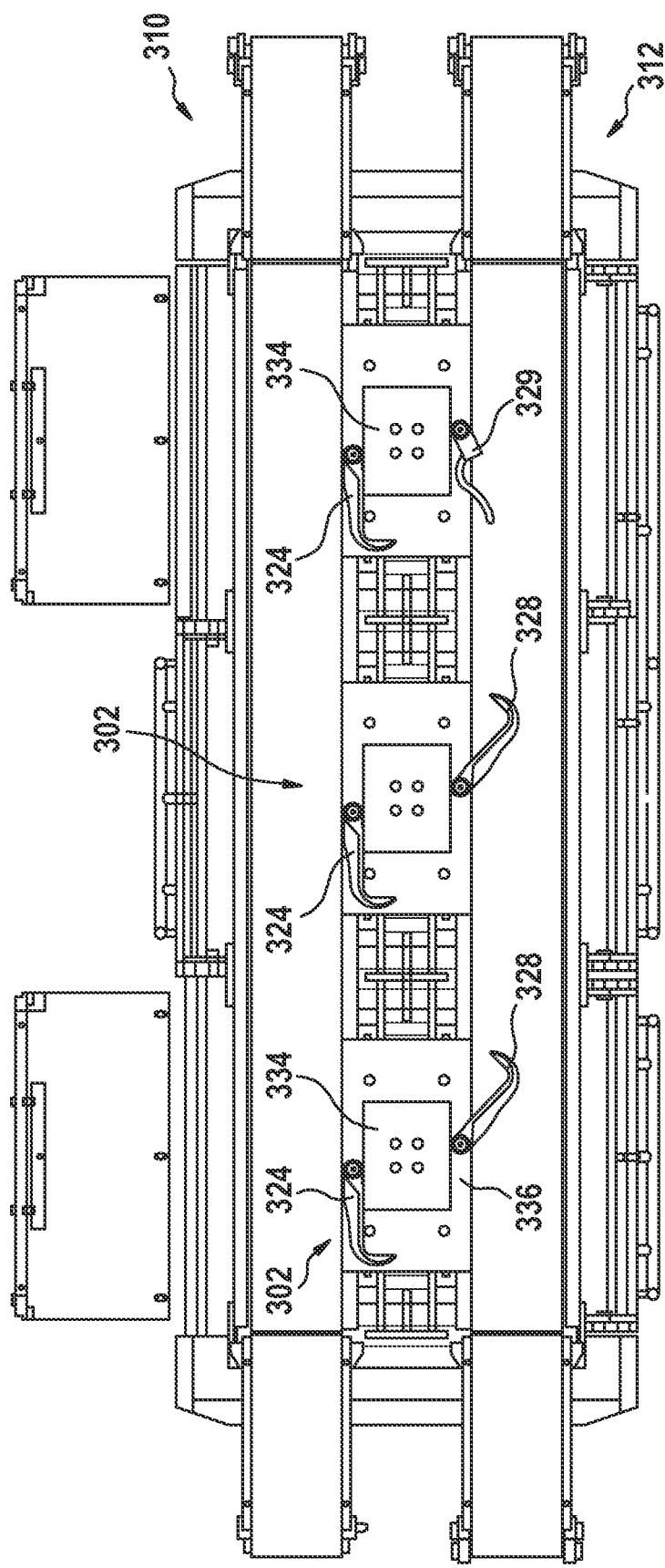
FIG. 4 is a top plan view of an embodiment of the weighing stations of the disclosed subject matter.
Figure 5:
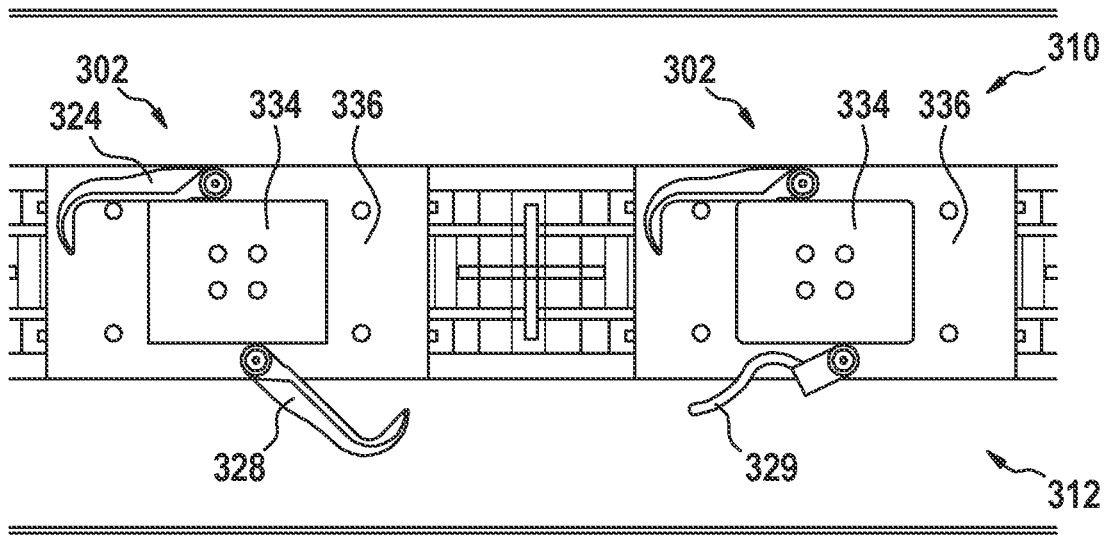
FIG. 5 is a top plan view of an embodiment of the weighing stations of the disclosed subject matter.
Figure 6:
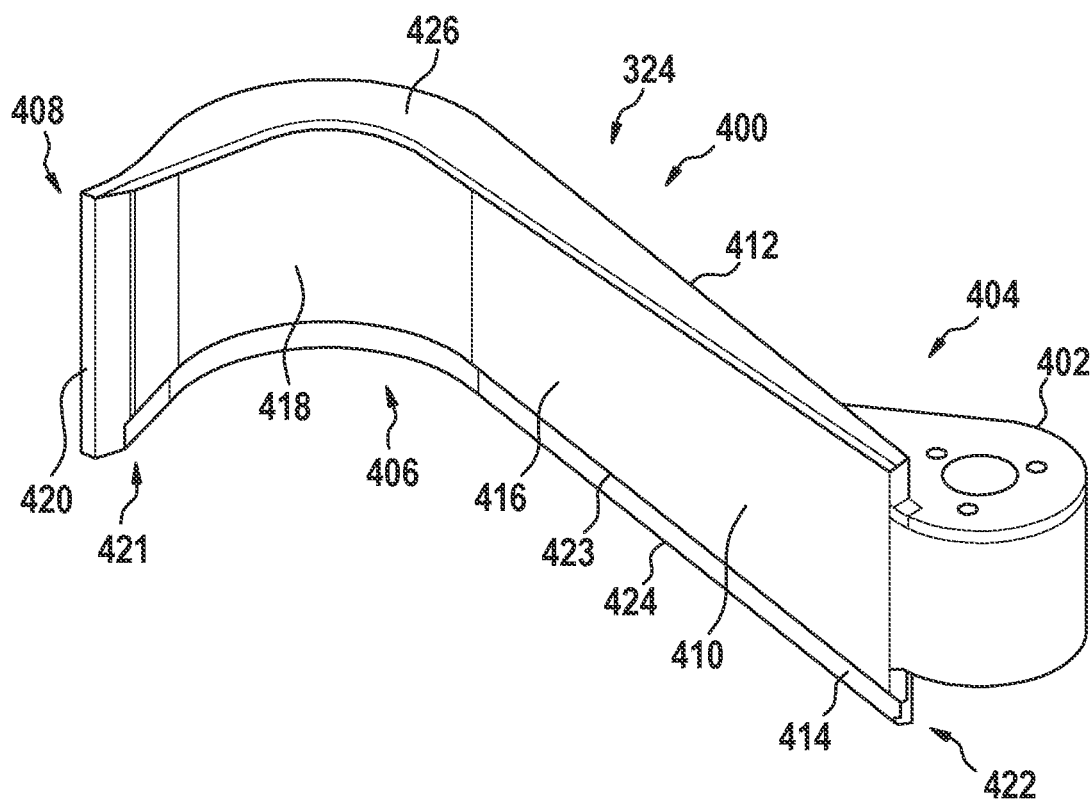
FIG. 6 is an isometric view of a guide of the disclosed subject matter.
Figure 7:
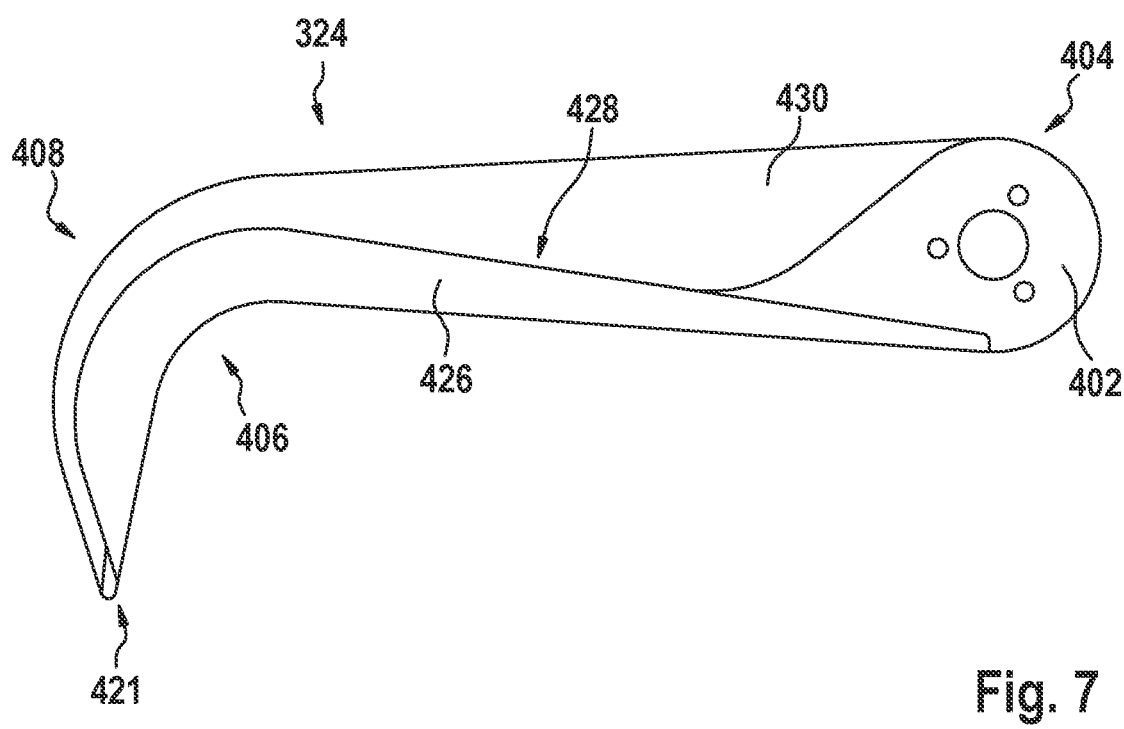
FIG. 7 is a top plan view of a guide of the disclosed subject matter.
Figure 8:
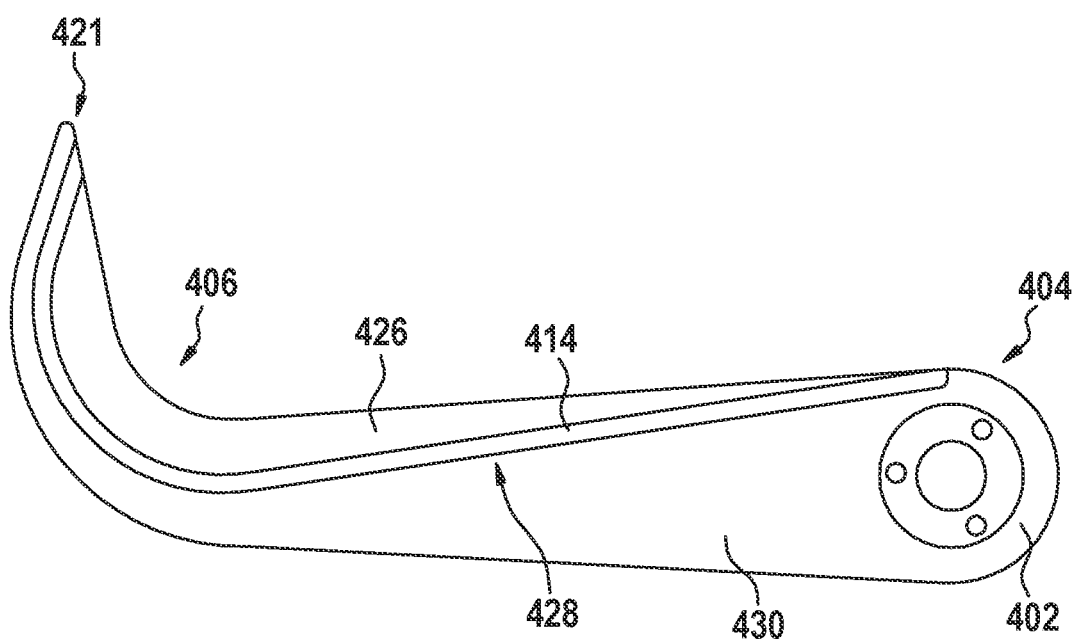
FIG. 8 is a bottom plan view of a guide of the disclosed subject matter.

Referring to FIGS. 2-3, each weighing station 302 includes a first guide 324 and an adjacent second guide 328.

The guides 324, 328 are made from lightweight material, and as such have a low moment of inertia to allow the associated actuators to easily control precise movement of the guides. The guides cooperate to move food parts 304 from the third conveyor 310 to a scale 330. As a food part 304 moves along the third conveyor 310, a weighing station 302 that can accept a food part 304 for weighing retrieves a food part 304 from the belt of the conveyor 310. The first guide 324 is operably controlled by a first actuator 322, such as a PLC controlled servomotor. The first guide 324 is connected to the first actuator 322 by a shaft 323. The first actuator 322 transfers the food part 304 to a scale 330 by first rotating the first guide 324 (in FIG. 3, counterclockwise) into a position in-between adjacent food parts 304 as the food parts pass the weighing station 302.

The scale 330 has a deck 334 operably connected to a weight sensing apparatus, such as a load cell, and the deck 334 is surrounded by a platform 336. The platform 336 extends between the third conveyor 310 and fourth conveyor 312. The load cell is operably connected to the PLC for recording and tracking the weight of the food part 304. As the food part 304 passes the deck 334 the first guide contacts the food part 304 and moves it laterally from the direction of travel of the third conveyor 310, off of the third conveyor 310 and onto the deck 334. A lateral edge of the platform 336 abuts the edge of the belt of the third conveyor 310 allowing a smooth transition of the food part 304 from the belt onto the deck 334.

The first guide 324 moves the food part 304 rapidly laterally off of the belt, and a second actuator 326 is operably connected to the second guide 328 by a shaft 327 and receives or soft catches the food part 304 as it crosses from the platform 336 onto the deck 334 to arrest the lateral movement of the food part 304 so that is lands on the deck 334. The second guide 328 arrests movement of the food part 304 by coming into contact with the food part 304 and moving clockwise (in FIG. 3) to decelerate the food part 304 so it comes to rest on the deck 334. The food part 304 dwells on the deck 334 for approximately 0.050 to 0.100 seconds before being transferred by the second guide 328 onto the adjacent fourth conveyor 312.

In an embodiment the first guide 324 and second guide 328 move food parts 304 into the field of a detector, such as optical detectors for assessing the dimension and other physical characteristics of the food part 304, or to an emitter-detector, such as an x-ray device for assessing the presence of foreign matter, such as bones.

To transfer a food part 304 from the third conveyor 310 to the fourth conveyor 312 the second guide 326 rotates counterclockwise, engaging the food part 304 moving it laterally off of the deck 334 onto the belt of the fourth conveyor 312. The food part 304 is transferred onto a vacant location on the belt. The fourth conveyor 312 moves the weighed food parts from the weighing station 302 to primer batches 338.

In an implementation, the content of the primer batch 338 includes food parts 304 of a particular type, and of specific weights. For example, the type could be poultry drumsticks, and the weight of each food part 304 would be the same or within a narrow range of measurements. As the food processing system 300 prepares the requisite primer batches 338, the system 300 gathers food parts 304 with their known characteristics from the weighing station 302, and gathers one or more food parts 304 in the primer batches 338 having desired characteristics.

Referring to FIGS. 4-8, an embodiment of the first guide 324 has an L-shaped plan formation allowing it to move into the open space between food parts 304 arranged on the third conveyor 310. In an embodiment an alternative second guide 329 has a curvilinear form. The first guide 324 has a body 400 extending from a base 402 formed at a proximal end 404 to a pocket 406 formed at a distal end 408. The body 400 forms a vertical wall 410 extending between a top edge 412 and a bottom edge 414 forming a first front face 416 extending between the base 402 and the pocket 406.

The pocket 406 forms a concave second front face 418 extending from the first face 416 to a projecting edge 420 at a tip region 421. The lower edge 422 forms a lip 424 extending from the base 402 to the projecting edge 420 and a groove 423 that operate to lift the food part 304 off of the surface of the third conveyor 310. The projecting edge 420 aids in stopping continued movement of the food part 304 in the direction of the belt as the guide moves the food part 304 from the third conveyor 310 onto the scale 330.

The top edge 412 forms a flange 426 extending from the base 402 to the tip region 421 adding rigidity to the body 400 and prevents the food part 304 from moving up the first front face 416 or second front face 418 and exiting from the guide. The rear face 428 forms a rib 430 extending from the base 402 to the tip region 421 adding rigidity to the body 400. The rib 430 adds stiffness to the arm 332 without adding excessive weight. The base 402 includes apertures for securing the first guide 324 to the shaft 323 of the first actuator 322.

Figure 14:
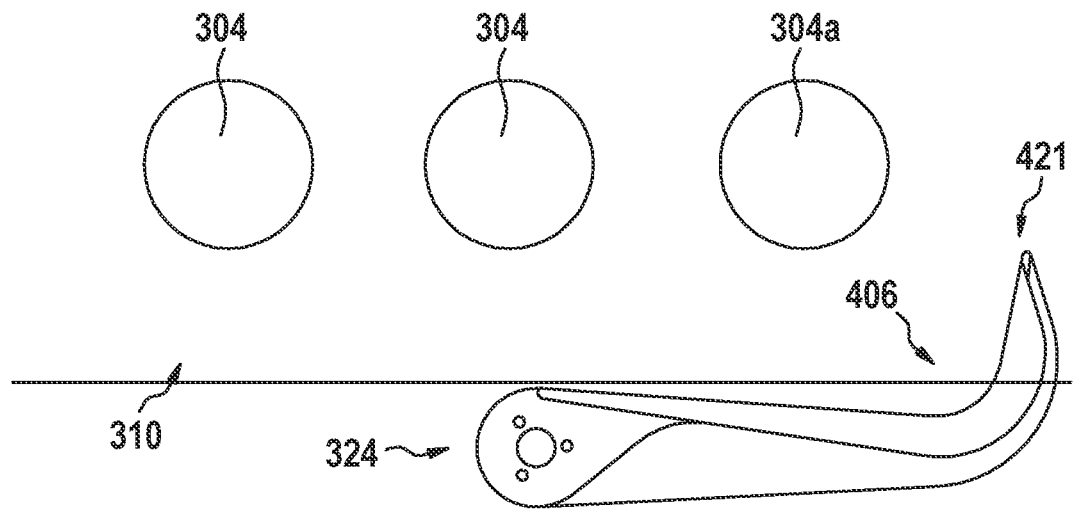
FIG. 14 is a plan view of an embodiment of the first guide interacting with food parts on a conveyor.
Figure 15:
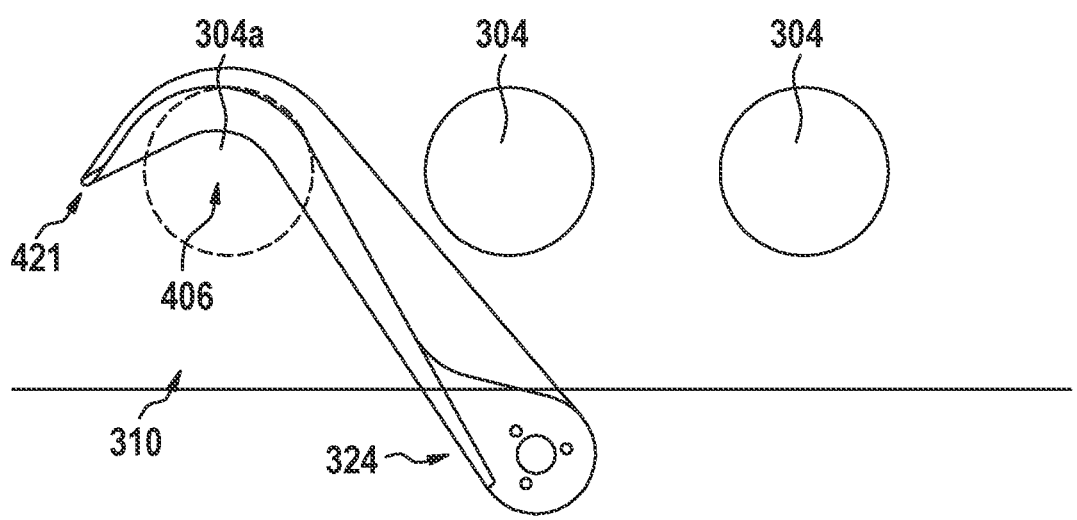
FIG. 15 is a plan view of an embodiment of the first guide interacting with food parts on a conveyor.
Figure 16:
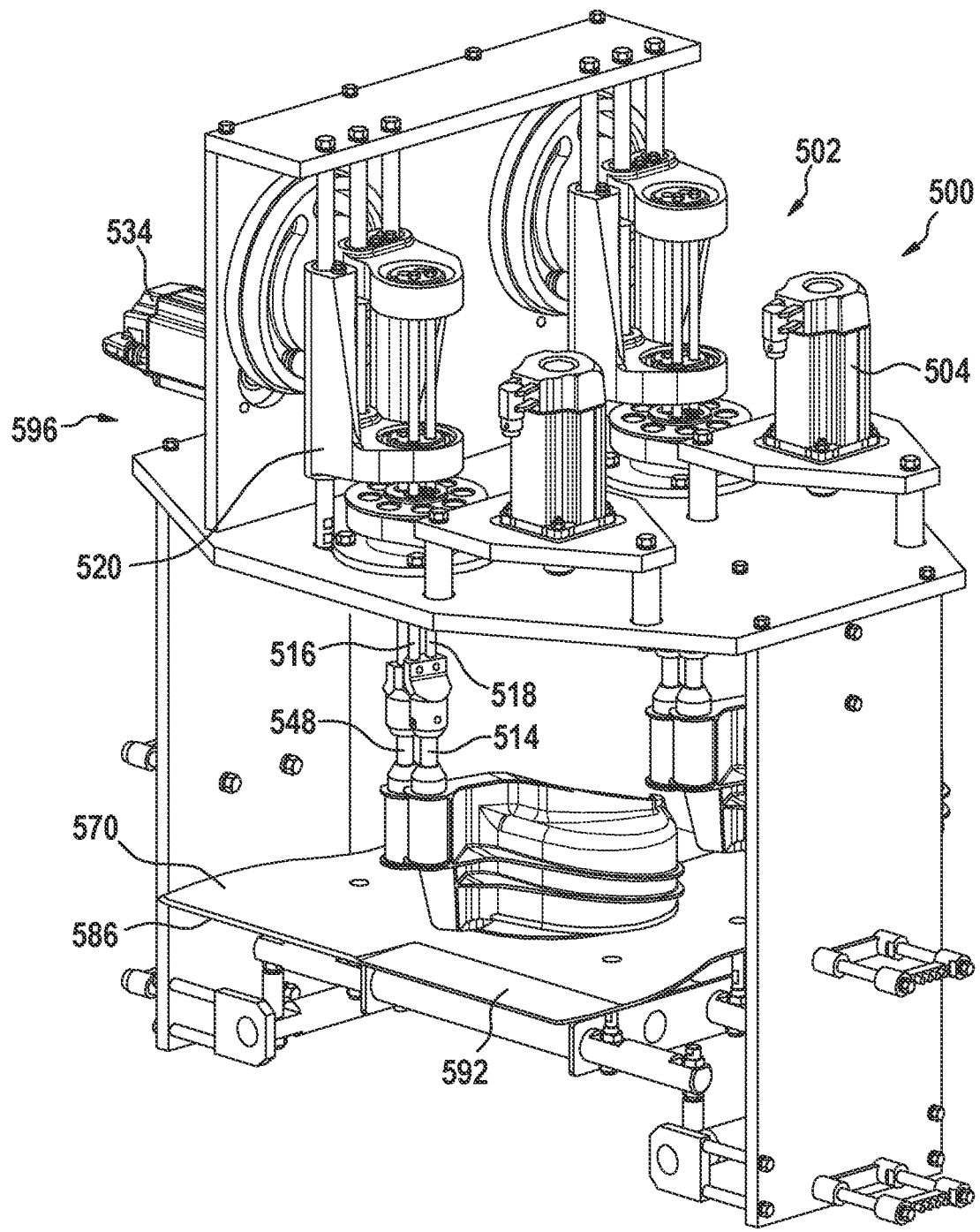
FIG. 16 is a perspective view of an alternative embodiment weighing station of the disclosed subject matter.
Figure 17:
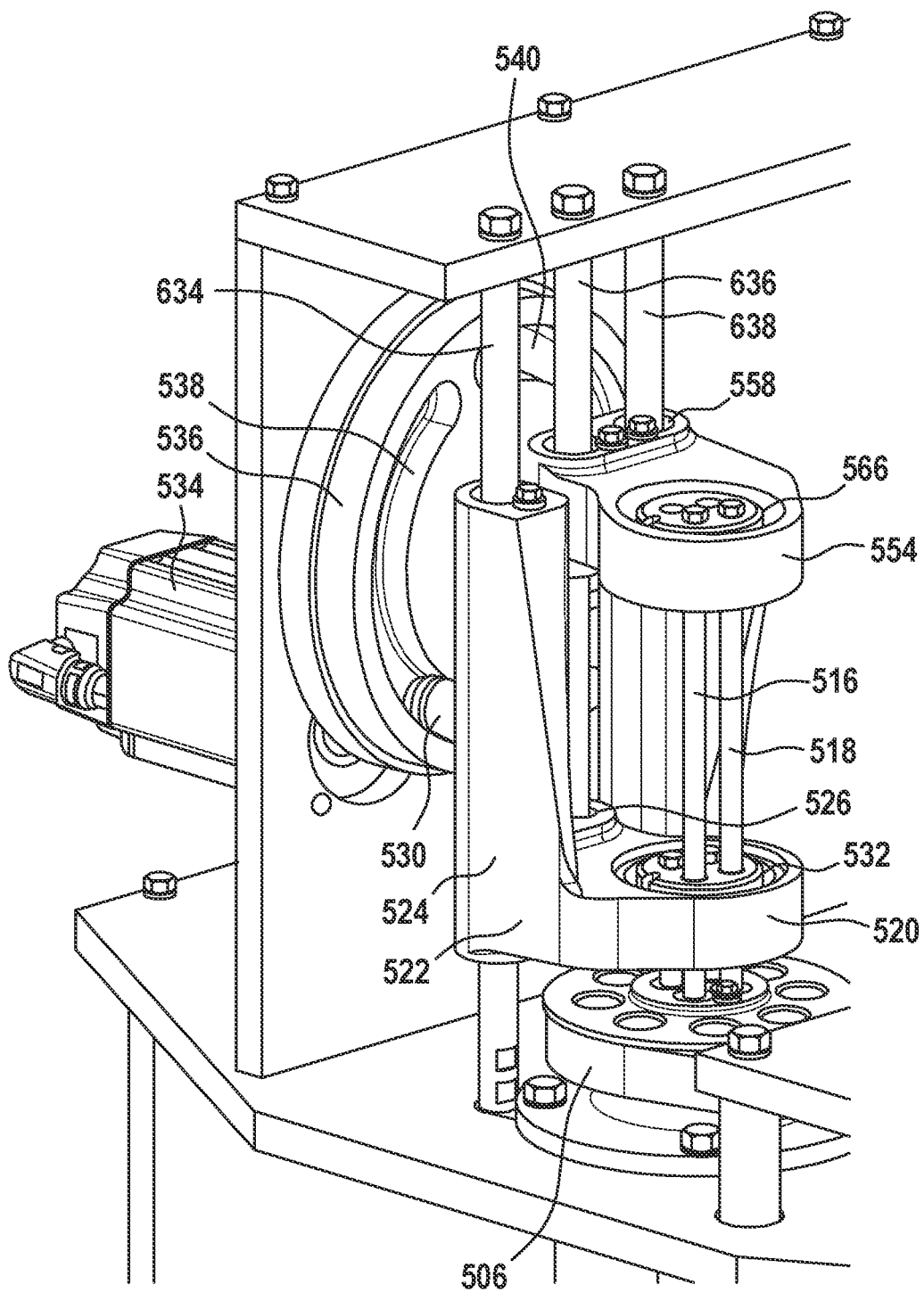
FIG. 17 is an enlarged perspective view of an alternative embodiment weighing station of the disclosed subject matter.
Figure 18:
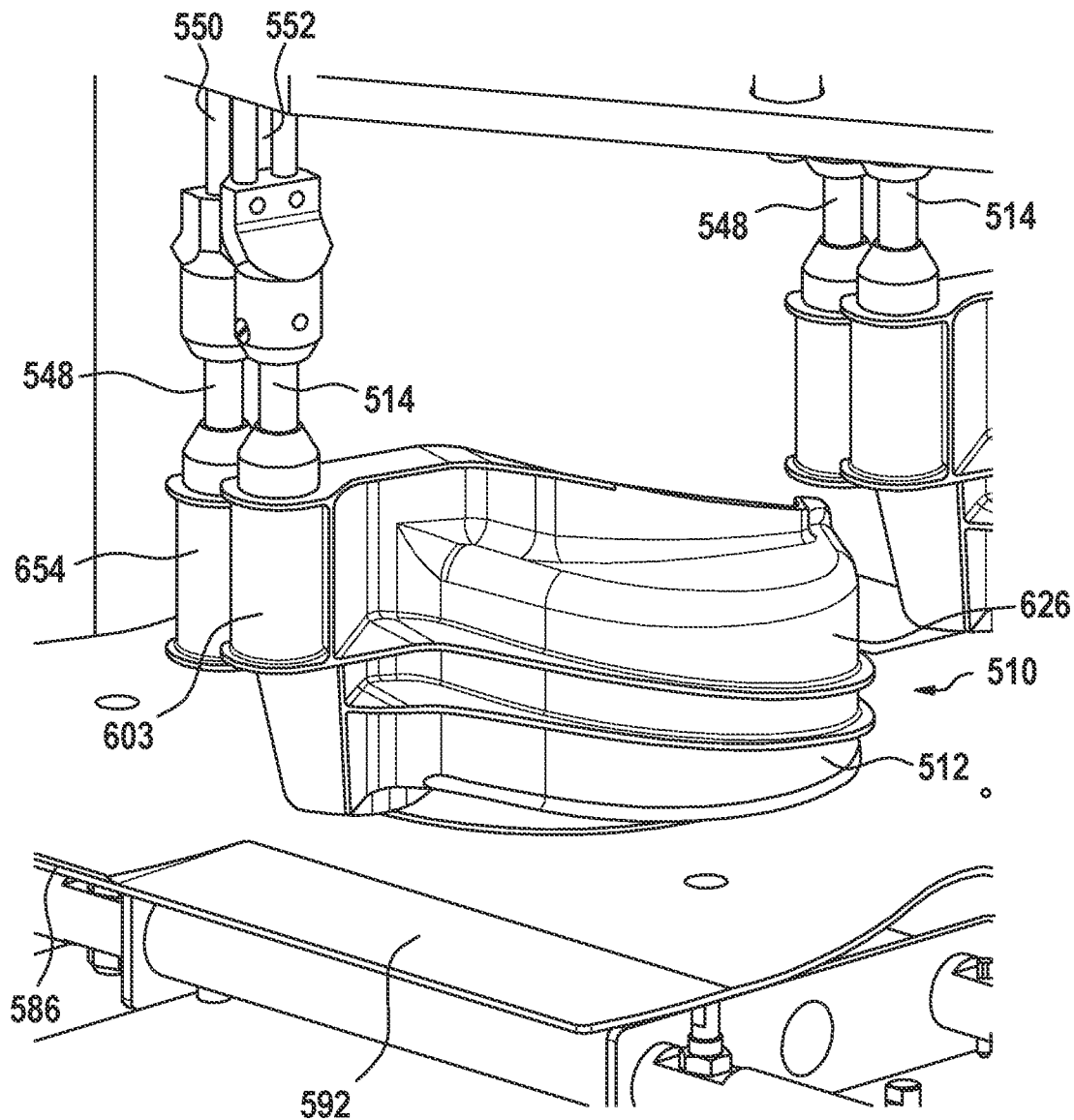
FIG. 18 is an enlarged perspective view of an alternative embodiment weighing station of the disclosed subject matter.
Figure 19:
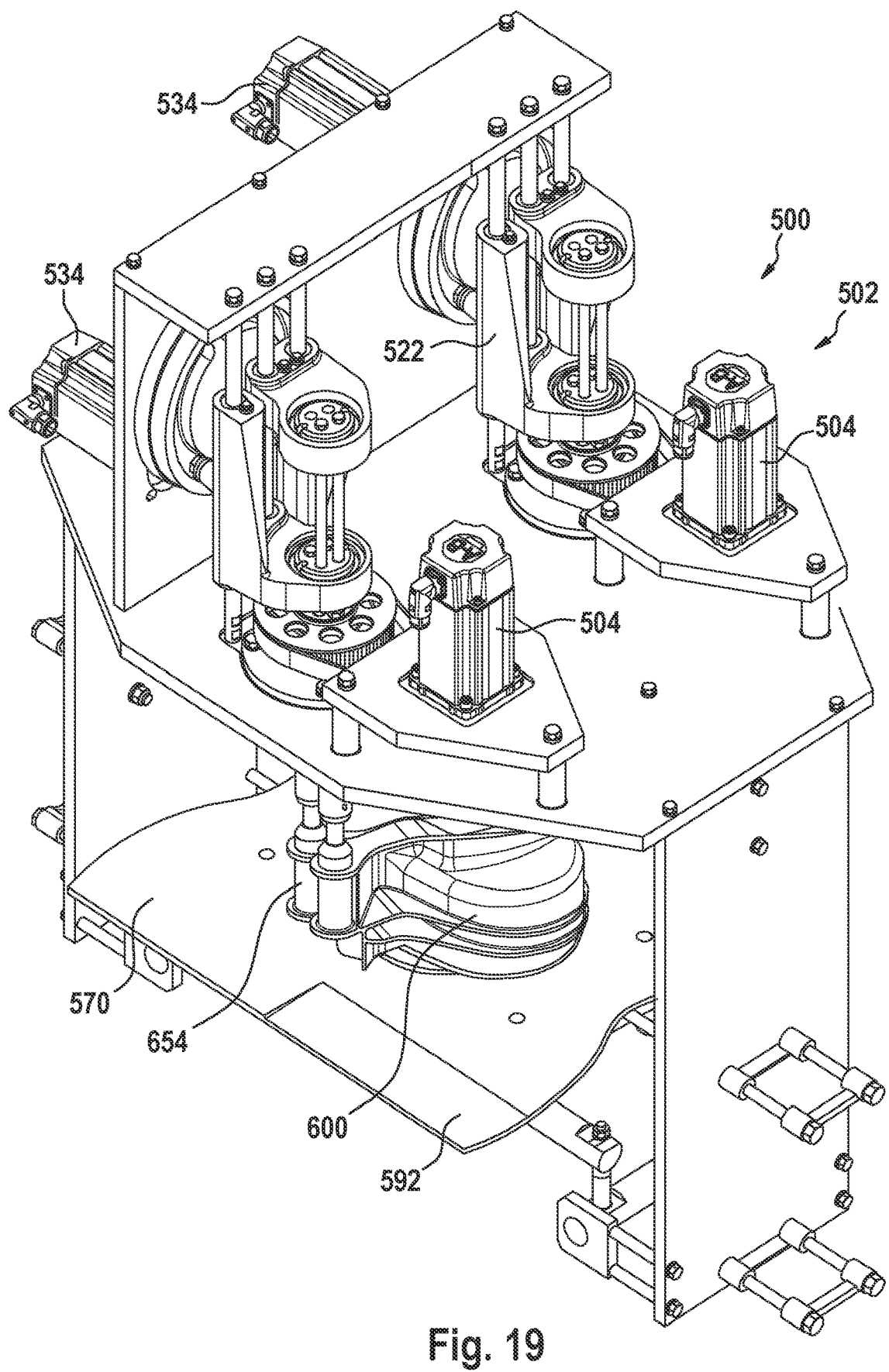
FIG. 19 is a perspective view of an alternative embodiment weighing station of the disclosed subject matter.
Figure 20:
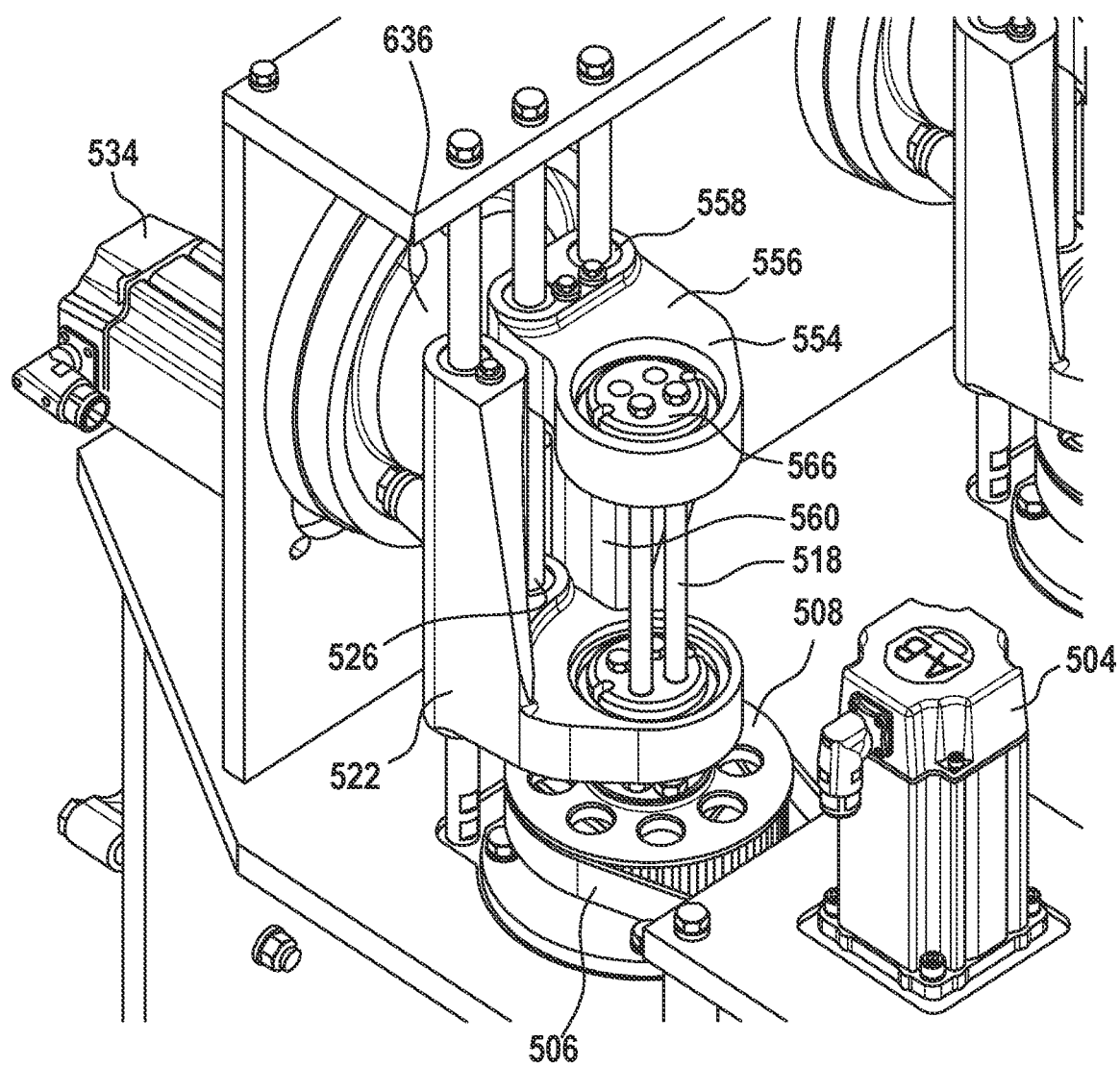
FIG. 20 is an enlarged perspective view of an alternative embodiment weighing station of the disclosed subject matter.
Figure 21:
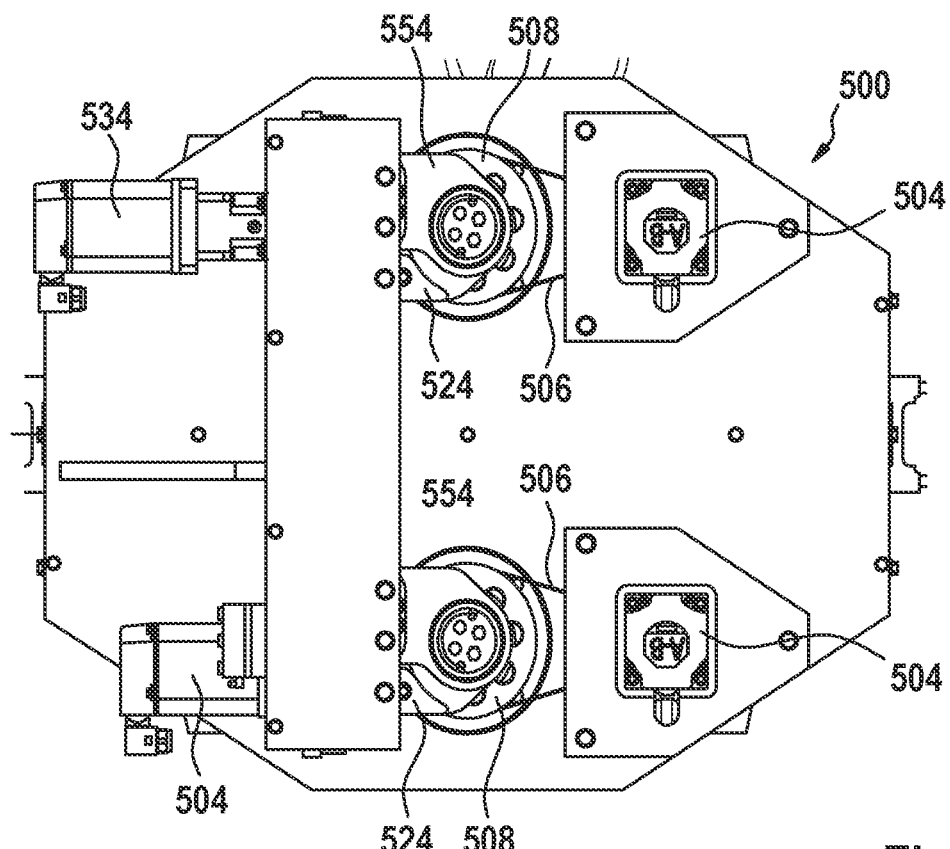
FIG. 21 is a plan view of an alternative embodiment weighing station of the disclosed subject matter.
Figure 22:
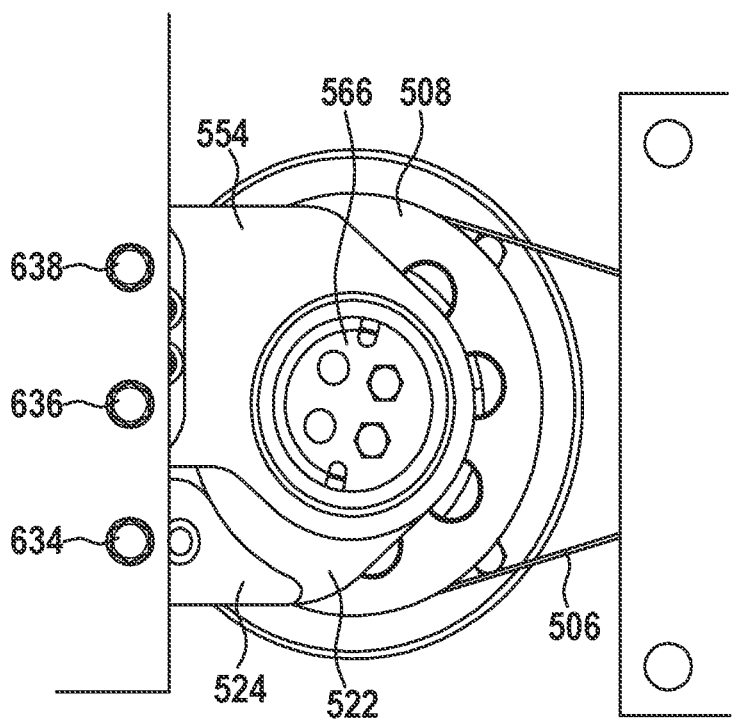
FIG. 22 is an enlarged plan view of an alternative embodiment weighing station of the disclosed subject matter.
Figure 23:
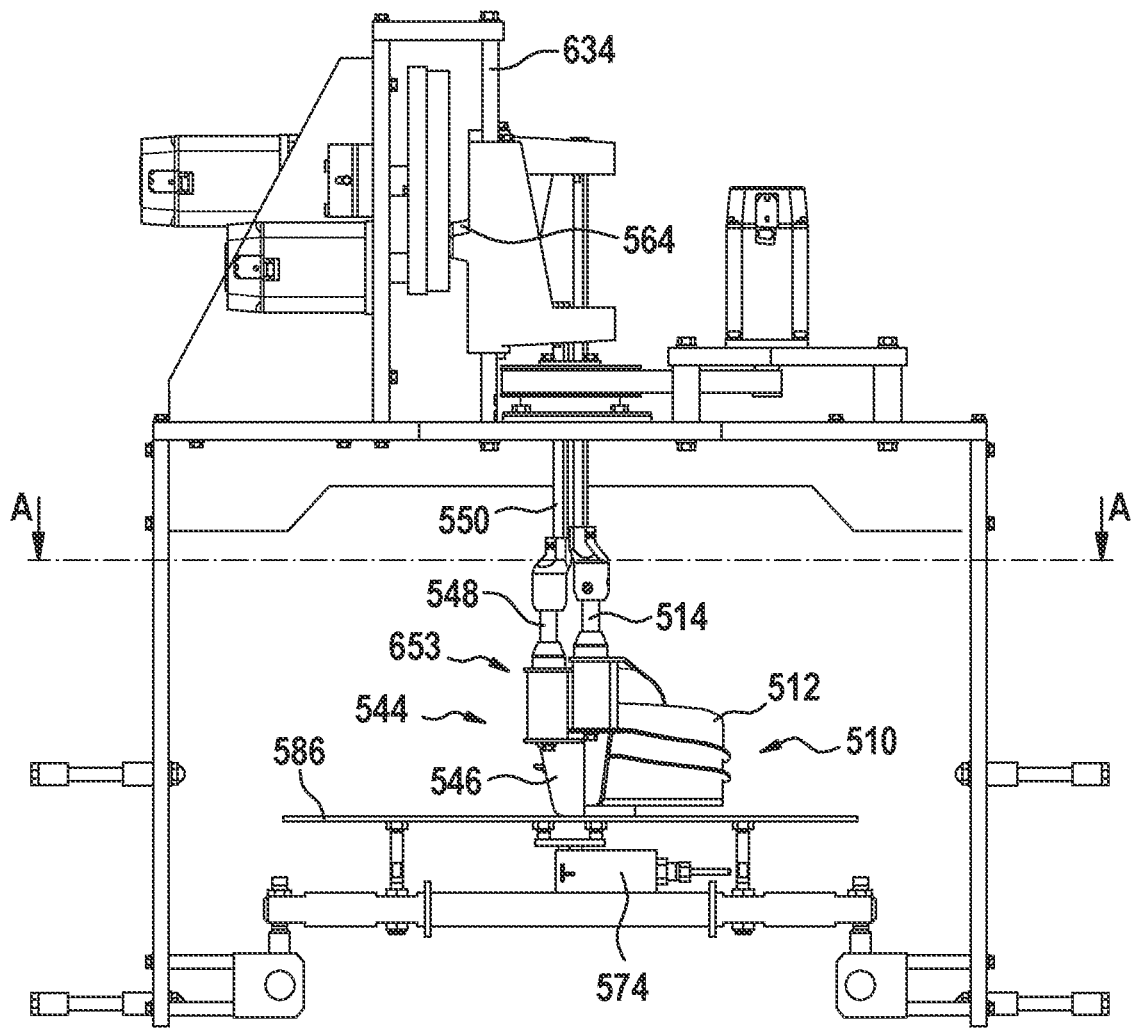
FIG. 23 is an elevation view of an alternative embodiment weighing station of the disclosed subject matter.
Figure 24:
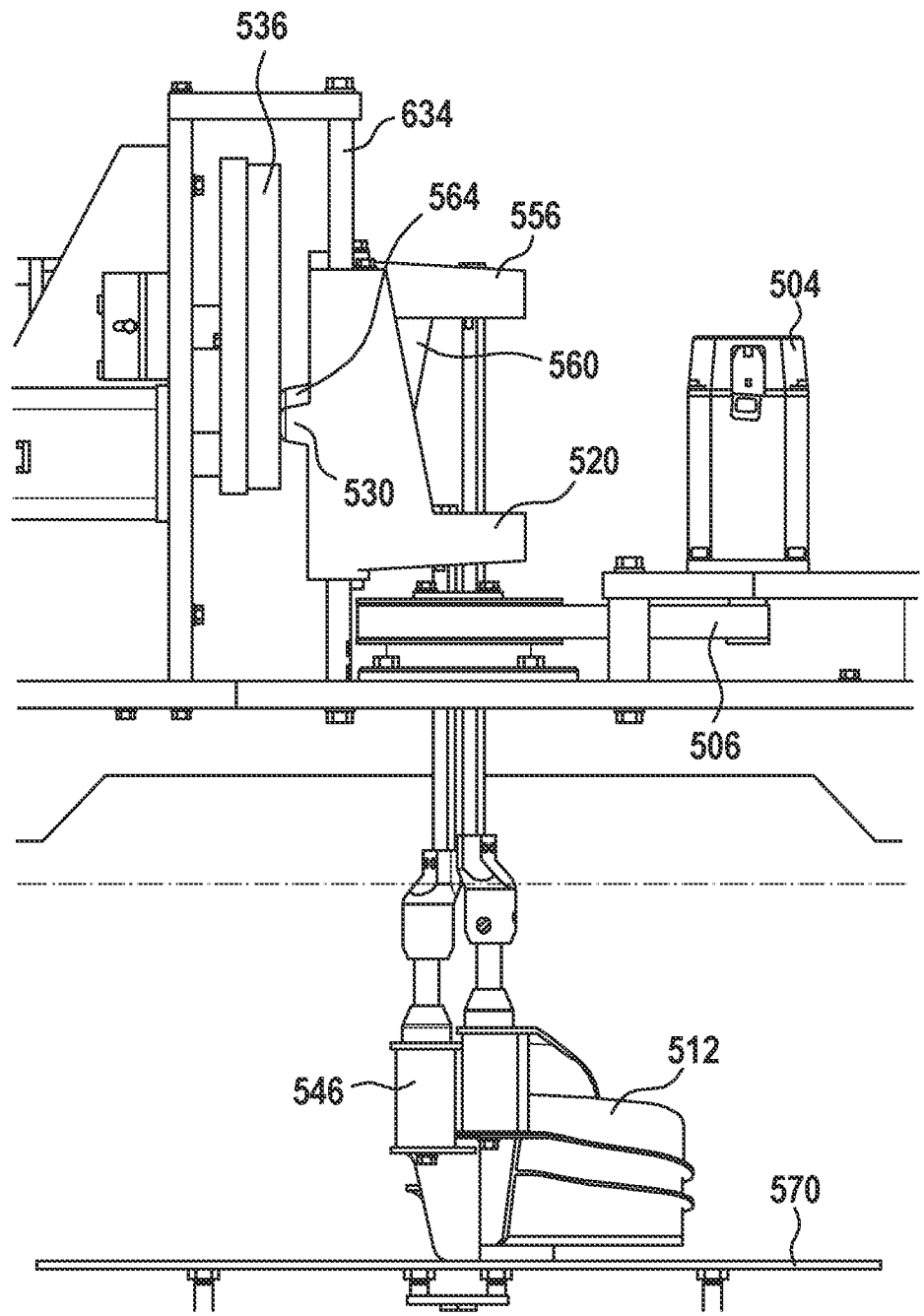
FIG. 24 is an enlarged elevation view of an alternative embodiment weighing station of the disclosed subject matter.
Figure 25:
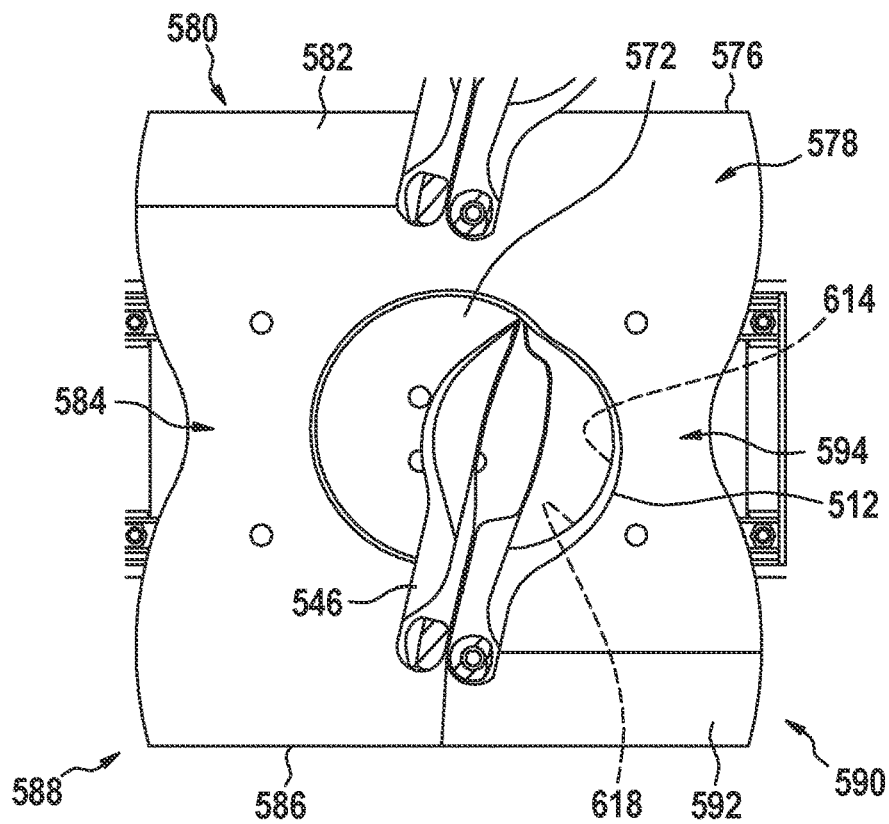
FIG. 25 is a plan view of the platform area of an alternative embodiment weighing station of the disclosed subject matter.
Figure 26:
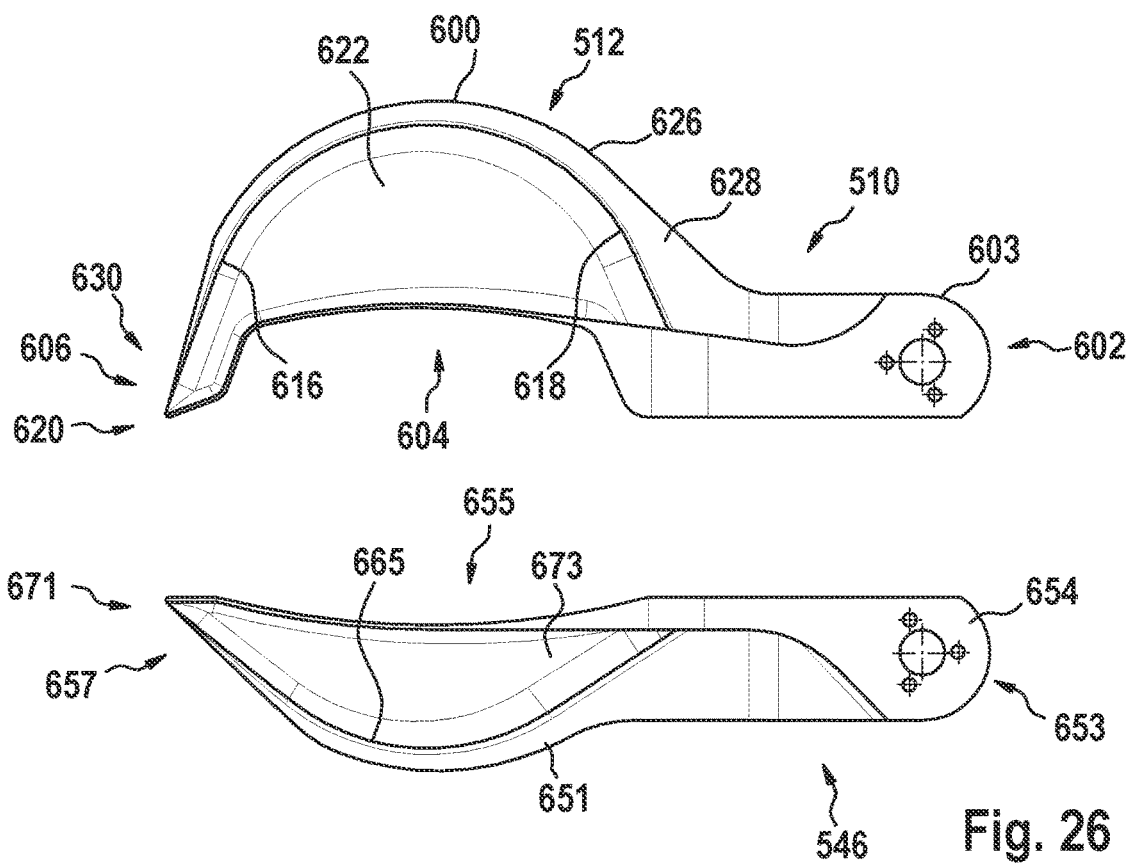
FIG. 26 is a plan view of alternative embodiment arms of the disclosed subject matter.
Figure 27:
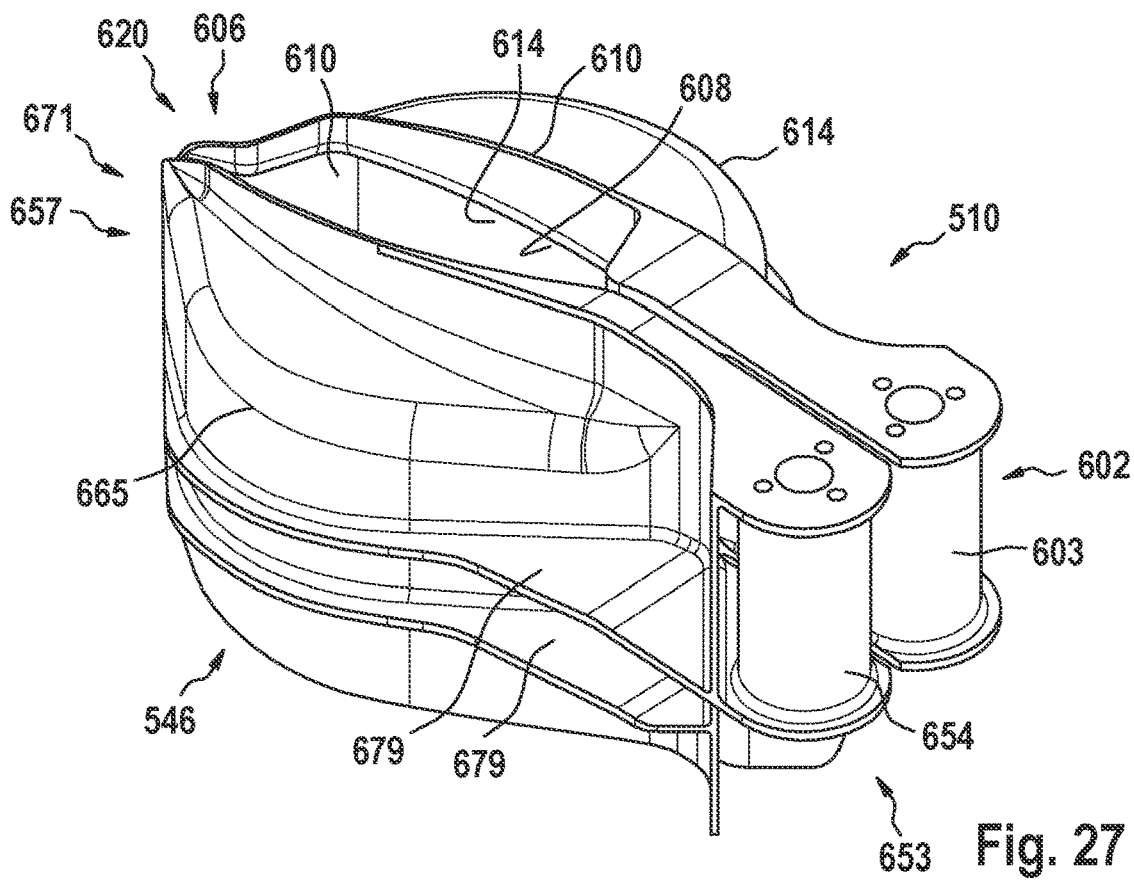
FIG. 27 is a perspective view of alternative embodiment arms of the disclosed subject matter.
Figure 28:
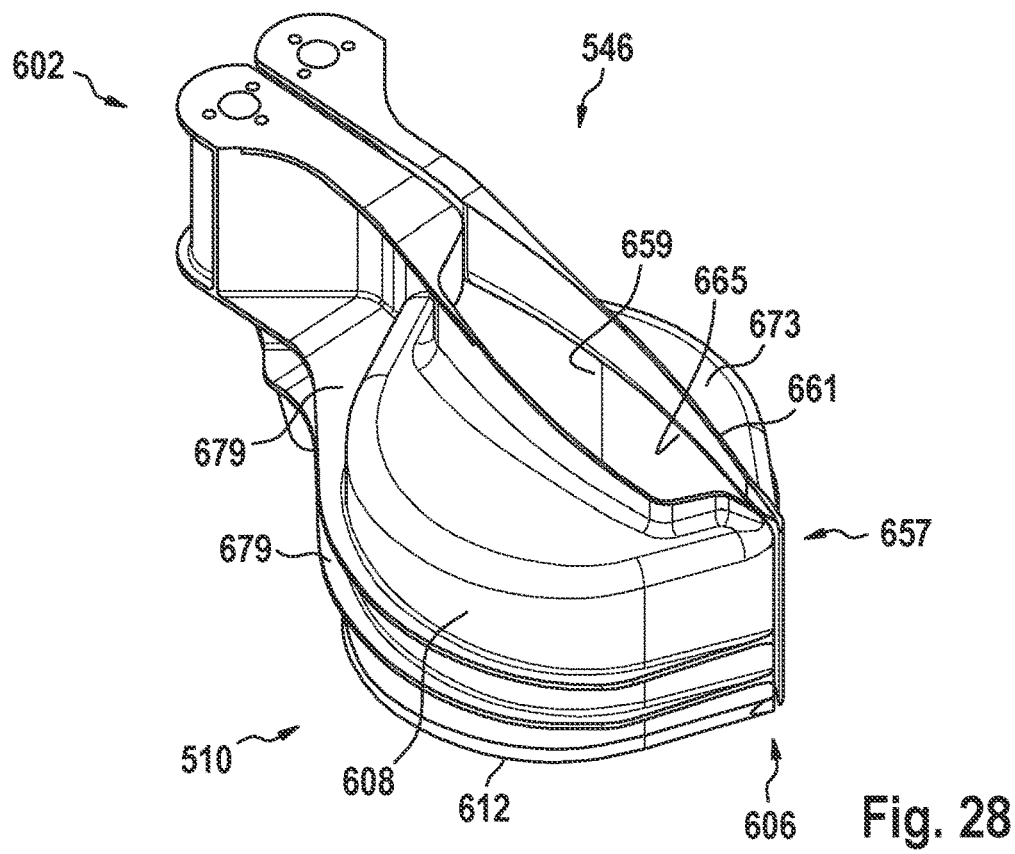
FIG. 28 is a perspective view of alternative embodiment arms of the disclosed subject matter.
Figure 29:
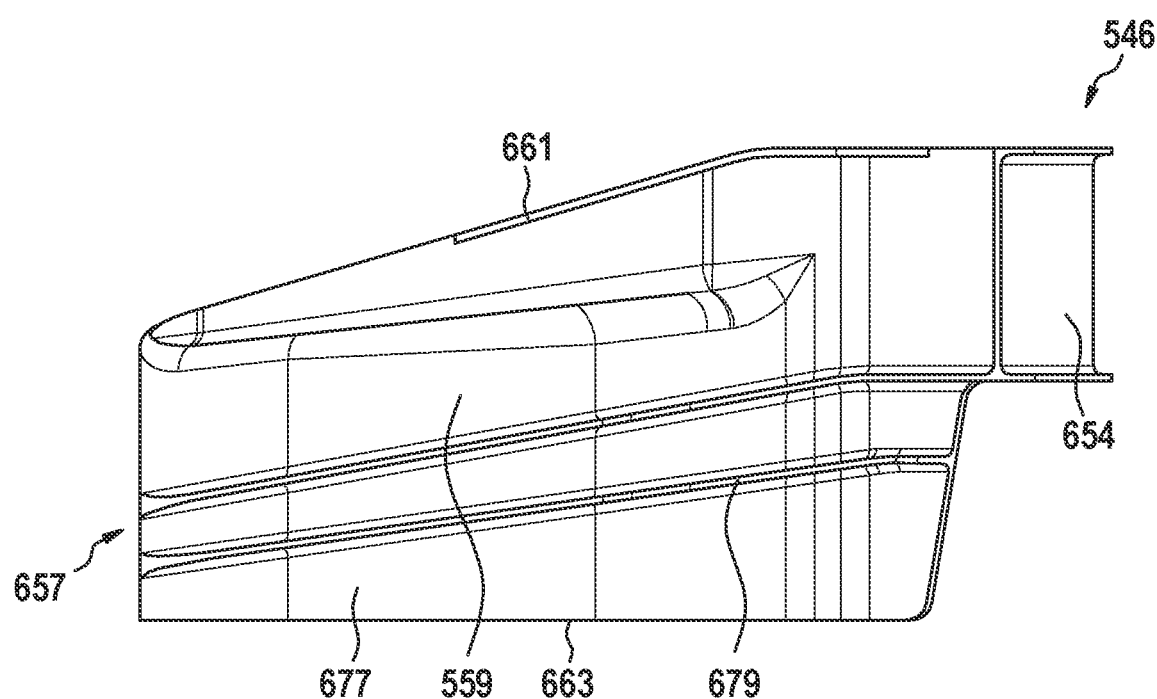
FIG. 29 is an elevation view of alternative embodiment leading arm of the disclosed subject matter.

Referring to FIGS. 14-15, the radius of the curved form of the pocket 406 is formed based on the food part 304 size being moved to allow the first guide 324 to enter into the moving path of the food parts 304 on the third conveyor 310 by inserting the narrow tip region 421 into the space between a food part 304 selected for weighing and the food part immediately upstream from the food part 304 selected for weighing. As the belt continues to move, referring to FIG. 14, the first guide 324 moves into position to remove food part 304a from the belt. In FIG. 15, the first guide 324 has rotated counterclockwise in pace with the moving belt of the third conveyor 310 to capture the food part 304a and transfer it laterally off of the belt and onto the scale 330.

Figure 9:
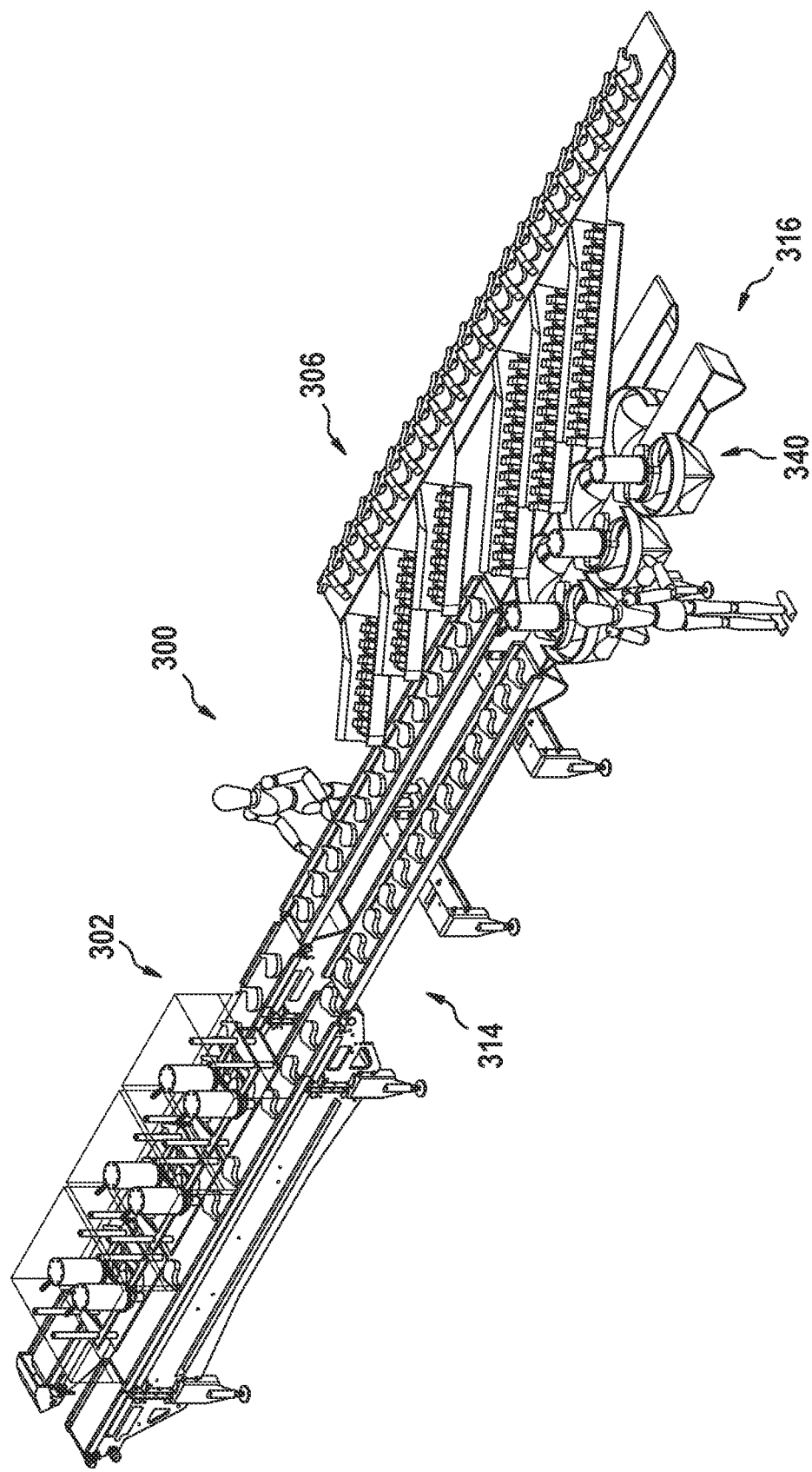
FIG. 9 is a perspective view of an alternative embodiment food processing system of the disclosed subject matter.
Figure 10:
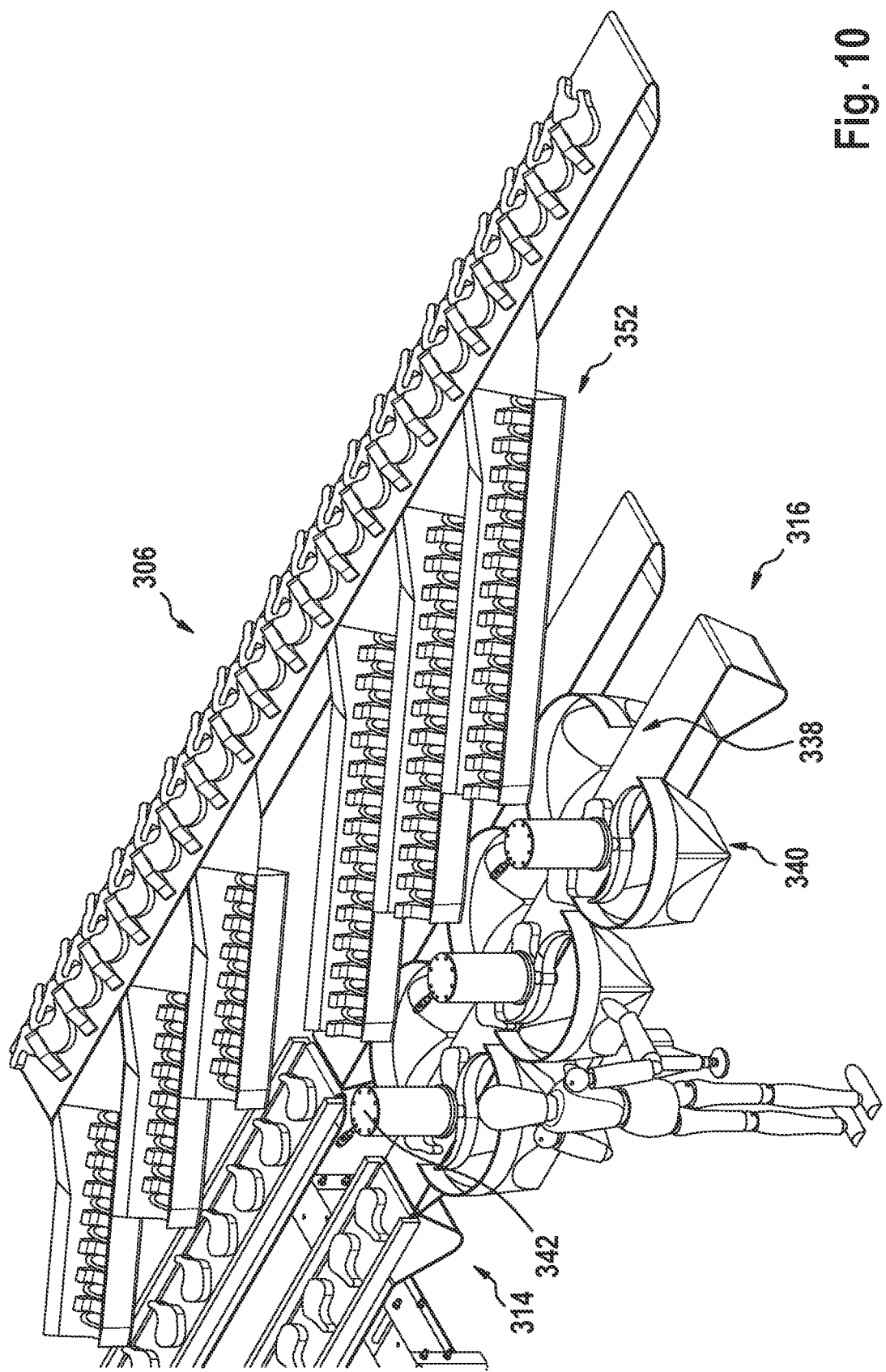
FIG. 10 is an enlarged perspective view of an alternative embodiment food processing system of the disclosed subject matter.
Figure 11:
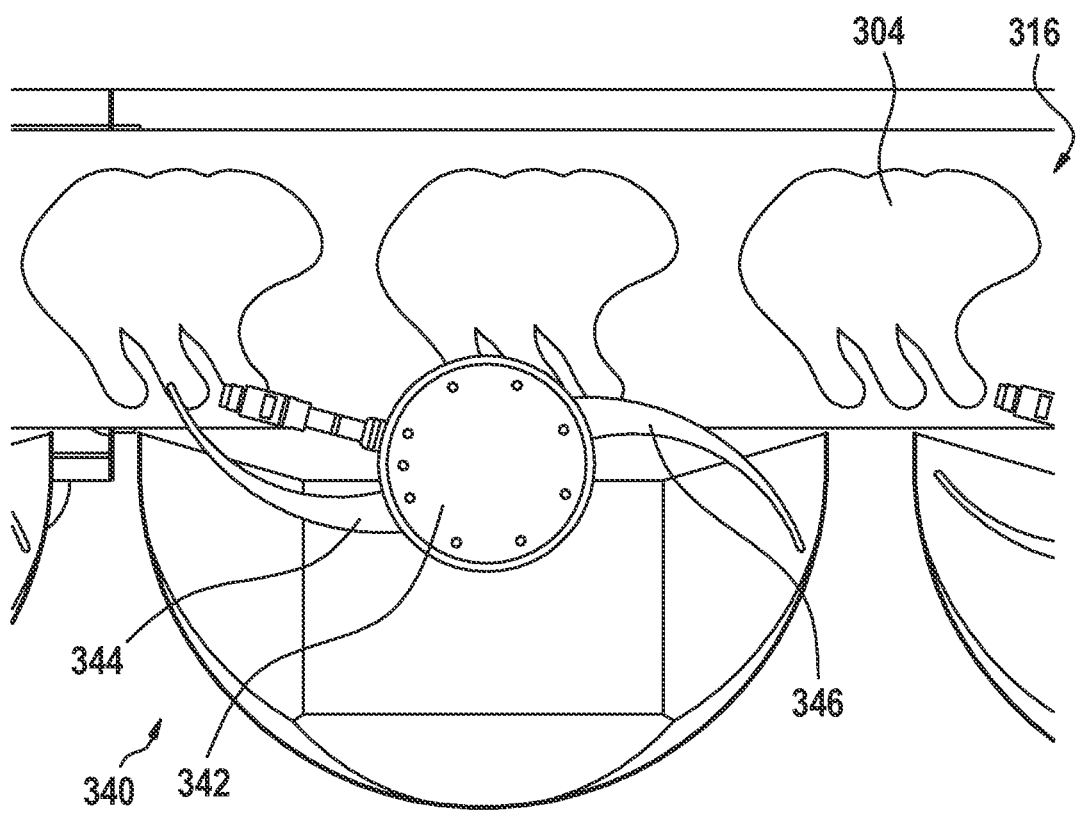
FIG. 11 is an enlarged perspective view of an alternative embodiment food processing system of the disclosed subject matter.

Referring to FIGS. 9-11, an alternative embodiment food processing system 300 is shown and described. The embodiment of FIG. 9 is similar to the embodiment of FIGS. 1-8, however it includes one or more augers 352 for transferring food parts 304 from the first conveyor 306 to the primer batches 338. The primer batches 338 are created by primer batch bins 340. The bins 340 are filled by the augers 352, and by a third actuator 342 with a third guide 344 and fourth guide 346. In an embodiment, the third actuator 342 is a servomotor controlled by the PLC. The food parts 304 are advanced by the fifth conveyor 314 to a sixth conveyor 316. As the food parts 304 pass the third actuators 342 the third guide 344 and fourth guide 346 are rotated, under control of a PLC, onto the belt between food parts 304 selectively removing the food parts 304 and depositing them into an adjacent bin 340.

Figure 12:
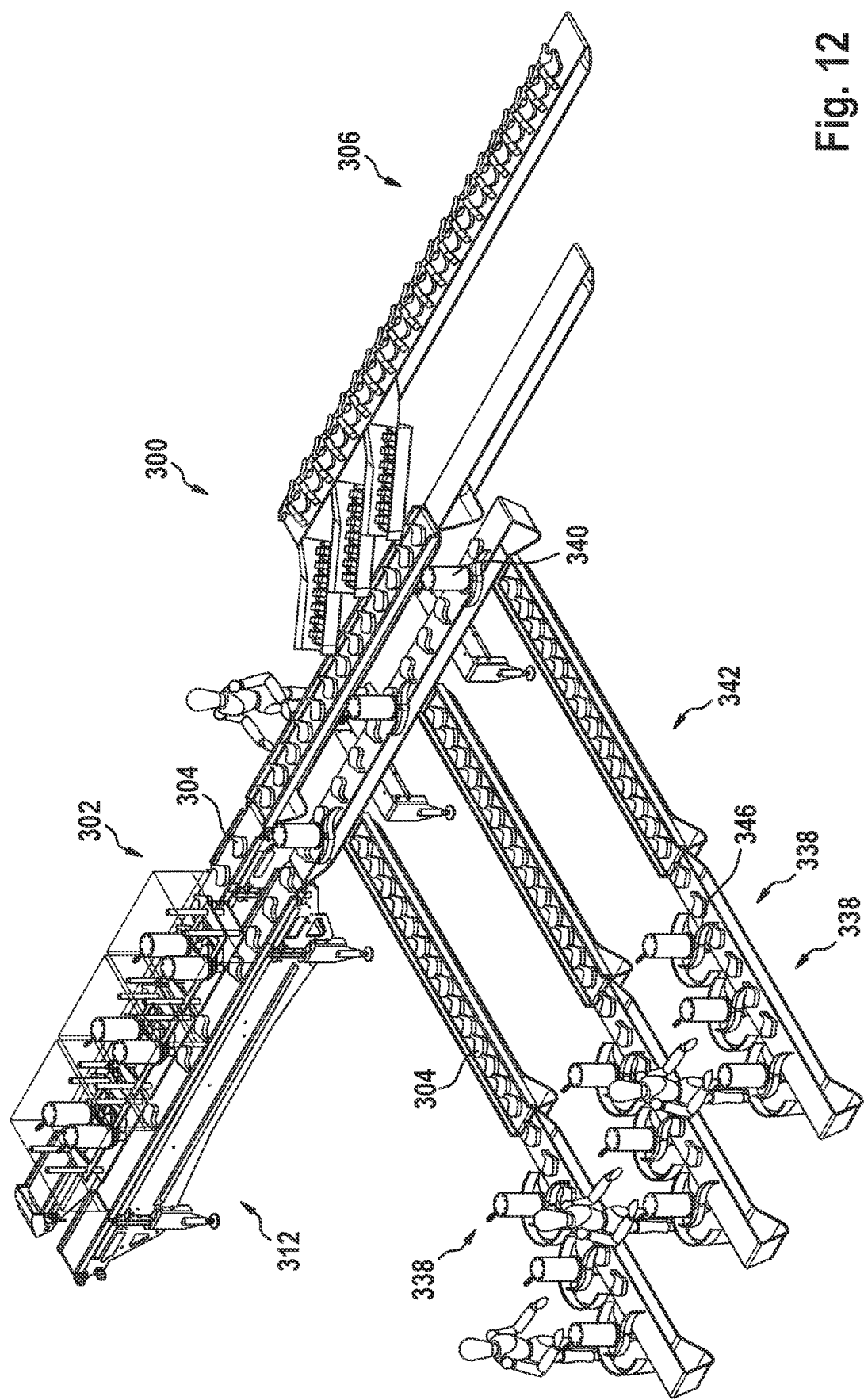
FIG. 12 is a perspective view of an alternative embodiment food processing system of the disclosed subject matter.

Referring to FIG. 12, an alternative embodiment food processing system 300 is shown and described where the grading is accomplished in the manner of FIG. 1, but when the weighed food parts 304 are on the fifth conveyor 314 they are further processed where the third actuators 430 move the food parts 304 into a target batching stream 342. Each target batching stream 342 includes a seventh conveyor 434 under PLC control advancing food parts 304 toward a targeted primer batch 338, whereby the PLC determines the criteria for each targeted primer batch 338 with the desired characteristics as explained above.

Figure 13:
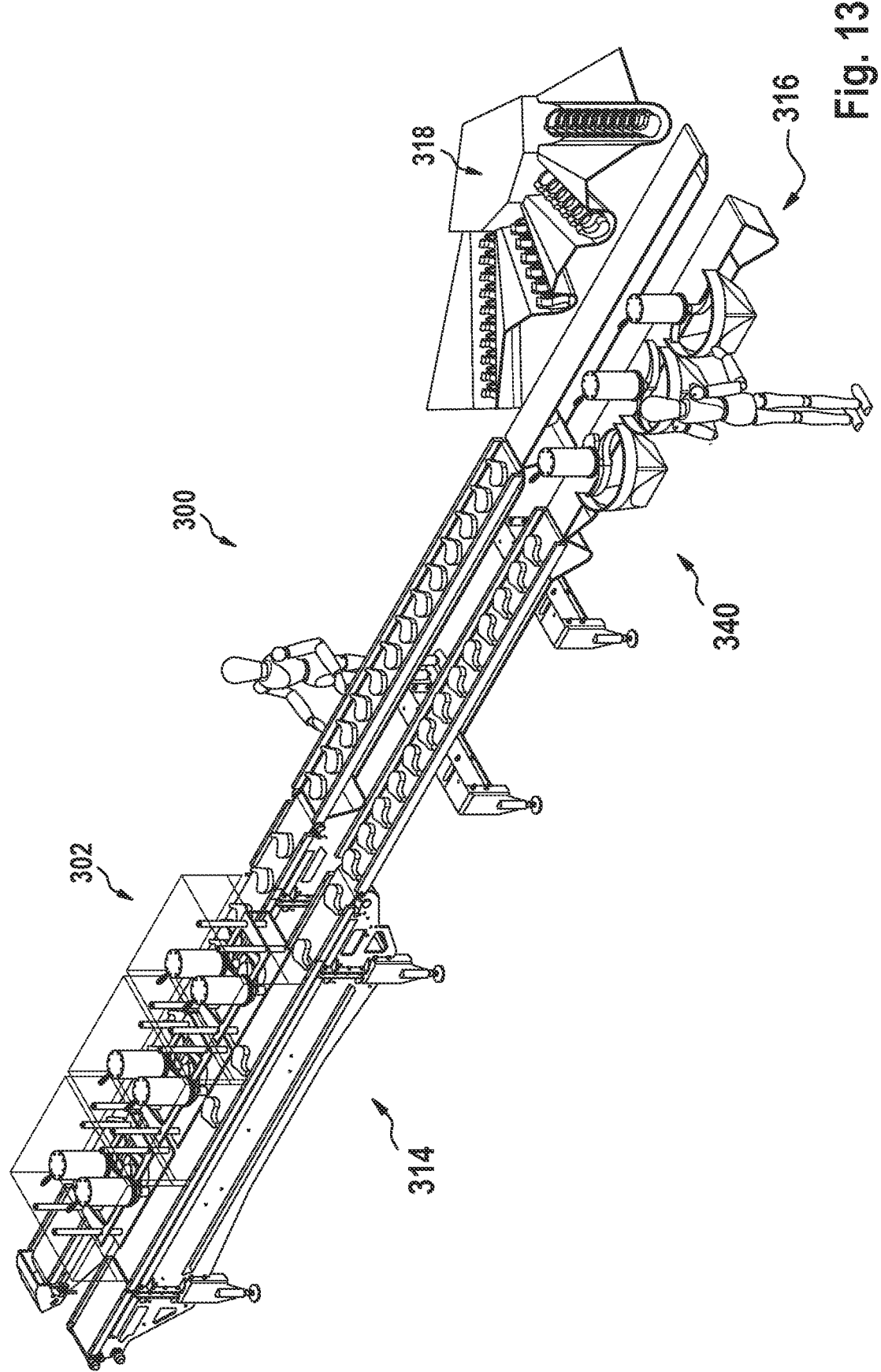
FIG. 13 is a perspective view of an alternative embodiment food processing system of the disclosed subject matter.

Referring to FIG. 13, an alternative embodiment of the food processing system 300 of FIG. 9 is shown whereby the augers 318 are in a radial arrangement and received food parts 304 from a central repository of food parts 304.

The first guide 324 has been shown in an embodiment of a food processing system 300 where the belt of the conveyors adjacent the weighing stations 302 delivering an unweighted food part 304 moves in a direction whereby the guides rotate counterclockwise, when viewed from a top plan orientation, in order to insert the first guide 324 into the stream of moving food parts 304. However, in embodiments where the conveyors are moving in an opposite direction from the described embodiment, the first guide 324 can be formed to have a reverse L-shaped plan formation, and similarly, the second guide 328 can have a reverse L-shaped plan formation.

Referring to FIGS. 16-29, an embodiment, the system 300 and method of weighing food parts 304 and processing weighed food parts 304 includes an alternative embodiment weighing station 500. The weighing station 500 is positioned between two conveyors, such as third conveyor 310 with a belt and fourth conveyor 312 with a belt. Referring to FIGS. 16-25, weighing station 500 is shown with a first transfer assembly 502 and adjacent second transfer assembly 596. The assemblies are located above a platform 570 with a centrally-located scale 574. The scale 574 has a deck 572 for receiving food parts 304 for weighing. The platform 570 extends between a first lateral edge 576 adjacent the third conveyor 310 and a second lateral edge 586 adjacent the fourth conveyor 312. The first lateral edge 576 has an upstream portion 578 and a downstream portion 580, with the downstream portion 580 forming a first transition area 582. The first transition area 582 extends toward the third conveyor 310 terminating at the first lateral edge 576 below the top of the belt. The second lateral edge has an upstream portion 588 and a downstream portion 590, with the downstream portion 590 forming a second transition area 592. The second transition area 592 extends toward the fourth conveyor 312 terminating at the second lateral edge 586 below the top of the belt.

A isolation zone 584 adjacent the deck 572 is located between the first transition area 582 and second lateral edge 586, and another isolation zone 594 adjacent the deck 572 is located between the first lateral edge 576 and second transition area 592. The transition areas 582, 592 improve removal of the poultry parts 304 from the belt because the lateral edge of the areas terminates below the top of the belt preventing the poultry part from becoming snagged between the belt and the lateral edge as they are moved by the transfer assemblies 502, 596.

The first and second transfer assemblies 502, 596 have the same structural features with the first transfer assembly moving food parts 304 from the platform 570 and scale 574 to the fourth conveyor 312, and the second transfer assembly moving food parts 304 from the third conveyor 310 to the platform 570 and scale 574. Therefore, the structural features of the first transfer assembly 502 will be discussed, and such is applicable to the second transfer assembly 596.

The first transfer assembly 502 has a trailing arm assembly 510 that cooperates with a leading arm assembly 544 to move a food part 304 from the third conveyor 310 to the scale 574. The trailing arm assembly 544 includes a trailing arm 512 operably connected to a lower mount 520 and an upper mount 554. A first rod 516 and adjacent second rod 518 are connected to the trailing arm 512 by a coupler 514. The rods 516, 518 extend upward from the trailing arm 512, through a plate 508, through a lower bearing 532 in the lower mount 520, and terminate at an upper bearing 566 in the upper mount 554.

The leading arm assembly 544 includes a leading arm 546 operably connected to the lower mount 520. A first rod 550 and adjacent second rod 552 are connected to the leading arm 546 by a coupler 548. The rods 550, 552 extend upward from the leading arm 546, through the plate 508, and terminate at the lower bearing 532.

The trailing arm 512 and leading arm 546 are rotated over the third conveyor 310, platform 570, and scale 574 by a motor 504 operably connected to plate 508. In an implementation, the motor 504 is a servo motor controlled by the PLC, and a belt operably connects the motor 504 to the plate 508. The arms 512, 546 are moved vertically with respect to the conveyor 310, platform 570, and scale 574 by a motor 534 operably connected to one or both of the lower mount 520 and upper mount 554. In an implementation the motor 534 is a servo motor. Both arms 512, 546 can be elevated or lowered, and the arms can be independently elevated and lowered.

In an implementation, the motor 534 is connected to a cam plate 536, and the lower mount 520 includes a follower 530 extending from the mount 520 and engaging a first groove 538 in the cam plate 536, and the upper mount 554 includes a follower 564 extending from the mount 554 and engaging a second groove 540 in the cam plate 536.

The lower mount 520 and upper mount 554 move vertically along rails. The lower mount 520 has a body 522 forming a guide sleeve 524 adjacent a guide aperture 526, with a lower portion of the body 522 retaining the lower bearing 532. The guide sleeve 524 extends upward from the lower portion providing additional structure for engaging a first rail 634. The rails include a second rail 636 disposed between an adjacent first rail 634, and an adjacent third rail 638. The rails extend vertically between an upper frame member and a lower frame member. The first rail 634 passes through the guide sleeve 524, and the second rail 636 passes through the guide aperture 526.

In the implementation using the cam plate 536, the first rod 550 and second rod 552 are fixed to the lower bearing 532, and rotation of the plate 536 moves the first groove 538 resulting in vertical translation of the lower mount 520 along the first and second rails 634, 636, and therefore vertical translation of the leading arm 546.

The upper mount 554 has a body 556 forming a guide sleeve 558 adjacent a guide aperture 558, with an upper portion of the body 556 retaining the upper bearing 566. The guide sleeve 558 extends downward from the upper portion providing additional structure for engaging the second rail 636. The second rail 636 passes through the guide sleeve 558, and the third rail 638 passes through the guide aperture 558. In the implementation using the cam plate 536, the first rod 516 and second rod 518 are fixed to the upper bearing 566, and rotation of the plate 536 moves the second groove 540 resulting in vertical translation of the upper mount 554 along the second and third rails 636, 638, and therefore vertical translation of the trailing arm 512.

Referring to FIGS. 26-29, an embodiment of the trailing arm 512 has a body 600 extending from a base 603 at a proximal end 601 to a projecting edge 620 at a distal end 606, with a pocket 604 formed therebetween. The coupler 514 is connected to the base 603. The body 600 forms a vertical wall 608 extending between a top edge 610 and a bottom edge 612 forming a back wall 614 between an inner side wall 618 and an outer side wall 616. Within the pocket 604, the inner side wall 618, outer side wall 616, and back wall 614 forming a concave front face. A bottom edge 612 forms a lip extending from the base to the projecting edge 620, and the lip has a groove that operates to lift the food part 304 off of the surface of the third conveyor 310. The projecting edge 420 aids in stopping continued movement of the food part 304 in the direction of the belt as the trailing arm 512 moves the food part 304 from the third conveyor 310 onto the platform 570. The top edge 610 forms a overhang 622 extending from the base 603 region to the tip 630 region adding rigidity to the body 600, and prevents the food part 304 from moving up the wall of the pocket 604 and exiting the trailing arm 512. The rear face 626 forms one or more ribs 628 extending from the base 603 to the tip region 630 adding rigidity to the body 600. As with other embodiments, the rib 628 adds stiffness to the trailing arm 512 without adding excessive weight.

Referring to FIGS. 26-29, an embodiment of the leading arm 546 has a body 651 extending from a base 654 at a proximal end 653 to a projecting edge 671 at a tip region 681 at a distal end 657, with a pocket 655 formed therebetween. The coupler 548 is connected to the base 654. body 651 forms a vertical wall 659 extending between a top edge 661 and a bottom edge 663 forming a back wall 665 forming a concave front face. The bottom edge 663 forms a lip extending from the base 654 to the projecting edge 671. The top edge 661 forms an overhang 673 extending from the base 654 region adding rigidity to the body 651, and prevents the food part 304 from moving up the side wall of the pocket 655 and exiting the leading arm 546. The rear face 677 forms one or more ribs 679 extending from the base 654 to the tip region 681 adding rigidity to the body 651. The coupler 548 is connected to the base 654.

The trailing arm 512 and leading arm 546 are constructed of lightweight material, and a formed using characteristics that add strength but decrease weight, such as the use of minimal wall thickness and overhangs and ribs, resulting in arms with strength and a low moment of inertia.

The pocket 604 of the trailing arm 512 and pocket 655 of the leading arm 546 form a capture zone 598 for the food part 304 allowing the assemblies to 510, 544 to move food parts 304 about the conveyors 310, 312 and the scale 574 within the platform 570. In an implementation, as a food part 304 moves to the weighing station 500 on conveyor 310, the second transfer assembly 596 moves a food part 304 from the third conveyor 310 by first rotating the trailing arm assembly 510 and leading arm assembly 544, in an elevated position relative to the platform 570 and third conveyor 310, over the food part 304 on the third conveyor 310 identified for transfer.

As the third conveyor 310 moves food parts 304 on a belt adjacent the first lateral edge 576, moving in a direction that moves the food parts 304 from the upstream portion 578 to the downstream portion 580, motor 504 rotates the plate 508 to orientate the capture zone 598 above a food part 304 selected by the PLC for removal. Motor 534 rotates cam plate 536 to lower the trailing arm 512 and leading arm 546 together to place the arms on the belt with the food part 304 within the capture zone 598. Next, the arms 512, 546 are rotated counterclockwise (FIG. 25) by motor 504 whereby the food part 304 is moved from the belt of the third conveyor 310, across the first transition area 582 onto the platform 570. In an implementation, the food part 304 is held in this position until the scale 574 is clear and able to accept the food part 304. In an implementation, the food part 304 is moved immediately to the scale 574.

The food part 304 resides on the deck 572 and a weight measurement is taken before the food part 304 is moved off of the scale 574, In an implementation, the second transfer assembly 596 is used to move the food part 304 from the deck 572 to first transition area 582 or back to third conveyor 310. The arms 512, 546 are move vertically and rotated as previously described to position the food part 304 accordingly.

In an implementation, the first transfer assembly 502 moves the food part 304 from the scale 574 to the second transition area 592 or to the fourth conveyor 312.

In an implementation, the first transfer assembly 502 moves a food part 304 from the scale 574 by first rotating the trailing arm assembly 510 and leading arm assembly 544, in an elevated position relative to the platform 570, over the food part 304, by rotation of the plate 508. Once the capture zone 598 is above the food part 304, cam plate 536 is rotated to lower the arms 512, 546 to place the arms together on the deck 572. As the fourth conveyor 312 moves a belt adjacent the second lateral edge 586, moving in a direction that moves the belt from the upstream portion 588 to the downstream portion 590, the arms are rotated counterclockwise (FIG. 25) by motor 504 whereby the food part 304 is moved from the deck 572 across the upstream portion 588 onto the belt of the fourth conveyor 312 into a vacant spot on the belt selected by the PLC. Next, the camp plate 536 is rotated to raise the arms 512, 546 to clear the food part 304 now on the belt and moving along the fourth conveyor 312 away from the weighing station 500. The weighed food part 304 moves on through the system for further processing.

In an implementation, the food part 304 is held at the upstream portion 588 until the belt is clear and able to accept the food part 304. In an implementation, the food part 304 is moved immediately to the fourth conveyor 312. In an implementation, the first transfer assembly 502 moves a food part 304 from the scale 574 by first rotating the trailing arm assembly 510 and leading arm assembly 544, in an elevated position relative to the platform 570, over the food part 304, by rotation of the plate 508.

Once the capture zone 598 is above the food part 304, cam plate 536 is rotated to lower the arms 512, 546 to place the arms together on the deck 572. As the fourth conveyor 312 moves a belt adjacent the second lateral edge 586, moving in a direction that moves the belt from the upstream portion 588 to the downstream portion 590, the arms are rotated counterclockwise (FIG. 25) by motor 504 whereby the food part 304 is moved from the deck 572 across the upstream portion 588 onto the belt of the fourth conveyor 312 into a vacant spot on the belt selected by the PLC.

Next, the camp plate 536 is rotated to raise the arms 512, 546 to clear the food part 304 now on the belt and moving along the fourth conveyor 312 away from the weighing station 500. The weighed food part 304 moves on through the system for further processing.

In an implementation, the food part 304 is held at the upstream portion 588 until the belt is clear and able to accept the food part 304. In an implementation, the food part 304 is moved immediately to the fourth conveyor 312.

As required, detailed aspects of the present disclosed subject matter are disclosed herein; however, it is to be understood that the disclosed aspects are merely exemplary of the disclosed subject matter, which may be embodied in various forms. Therefore, specific structural and functional details disclosed herein are not to be interpreted as limiting, but merely as a basis for the claims, and as a representative basis for teaching one skilled in the art to variously employ the present disclosed subject matter in virtually any appropriately detailed structure.

The many features and advantages of the disclosed subject matter are apparent from the detailed specification. Further, since numerous modifications and variations will readily occur to those skilled in the art, it is not desired to limit the disclosed subject matter to the exact construction and operation illustrated and described. Accordingly, all suitable modifications and equivalents may be resorted to, and all fall within the scope of the disclosed subject matter.

The invention claimed is:

1. An apparatus for grading and batching of food parts, the apparatus comprising:
 a first conveyor adapted to sequentially transport the food parts;
 a plurality of batch bins adapted to receive a set of selected food parts;
 a weighing station adapted to weigh food parts, which have not yet been transferred into said batch bins, said weighing station being positioned downstream of the first conveyor,
 wherein said weighing station comprises a static scale and a pivoted first guide and a pivoted second guide, wherein said first guide is operably controlled by a first actuator and said second guide is operably controlled by a second actuator and wherein said first guide is adapted to controllably move food parts supplied by said first conveyor onto said static scale and the second guide is adapted to controllably move said food parts from said static scale onto a discharge conveyor after weighing, said discharge conveyor adapted to sequentially transport the weighed food parts from said weighing station to a plurality of controllable transfer units;
 wherein each batch bin is associated with at least one of said controllable second transfer unit adapted to selectively transfer particular ones of said food parts, which have been weighed into a selected one of said batch bins, said transfer units are adapted to selectively transfer said particular food parts from said discharge conveyor into a selected one of said batch bins;
 a control unit operatively connected with said scale unit, said weighing station, and said transfer units, and
 wherein said control unit is adapted to control said transfer units in order to assemble in each of said bins a plurality of said food parts to such an extent that the total weight of said food parts collected in each of said batch bins corresponds to a predetermined target weight.

2. The apparatus according to claim 1, wherein said static scale comprises a deck operably connected to a weight sensing apparatus, and said deck is surrounded by a platform.

3. The apparatus according to claim 1, wherein said first guide and said second guide are formed to have a reverse L-shaped plan formation.

4. The apparatus according to claim 1, wherein said first guide and said second guide have a curvilinear form.

5. The apparatus according to claim 1, wherein said first guide and/or said second guide has a body extending from a base formed at a proximal end to a pocket formed at a distal end.

6. The apparatus according to claim 5, wherein said body forms a vertical wall extending between a top edge and a bottom edge forming a first front face extending between said base and said pocket formed at said distal end.

7. The apparatus according to claim 5, wherein said pocket forms a concave second front face extending from said first front face to a projecting edge at a tip region.

8. The apparatus according to claim 7, wherein a lower edge forms a lip extending from said base to said projecting edge and a groove being adapted to lift said food part supplied by said first conveyor off of the surface.

9. The apparatus according to claim 2, wherein said first guide and said second guide are adapted to controllably move vertically with respect to said platform.

10. The apparatus according to claim 9, wherein said first guide and said second guide are adapted to be independently elevated and lowered.

11. The apparatus according to claim 9, wherein:
 said first guide and said second guide each comprises a leading arm, which has a body extending from a base at a proximal end to a projecting edge at a tip region at a distal end forming a pocket therebetween; and
 a trailing arm, which has a body extending from a base at a proximal end to a projecting edge at a distal end, with a pocket formed therebetween.

12. The apparatus according to claim 11, wherein said pocket of said trailing arm and said pocket of said leading arm form a capture zone for said food part.

13. The apparatus according to claim 1, wherein said first guide is adapted to controllably move food parts supplied by said first conveyor onto said scale by rotating said first guide, and said second guide is adapted to controllably move said food parts from said scale onto said discharge conveyor by rotating said second guide.

14. The apparatus according to claim 13, wherein a direction of rotation of said first guide is in accordance with a direction of conveyance of said food parts supplied by said first conveyor and/or a direction of rotation of said second guide is in accordance with a direction of conveyance of said food parts transported by said discharge conveyor.

15. An apparatus for selectively transferring food parts, comprising:
 at least a deck and a pivoted first guide and a pivoted second guide, the first guide pivotable about a first vertical axis and the second guide pivotable about a second vertical axis, wherein said first guide is operably controlled by a first actuator and said second guide is operably controlled by a second actuator and wherein said first guide is adapted to controllably move food parts onto said deck and the second guide is adapted to controllably move said food parts from said deck for discharging;
 wherein said first guide or said second guide has a body extending from a base formed at a proximal end to a pocket formed at a distal end, the pocket providing a pouch to receive food parts.

16. The apparatus according to claim 15, wherein said first guide and said second guide are formed to have a reverse L-shaped plan formation.

17. The apparatus according to claim 15, wherein said first guide and said second guide have a curvilinear form.

18. The apparatus according to claim 15, wherein said body of said first guide or said second guide forms a vertical wall extending between a top edge and a bottom edge forming a first front face extending between said base and said pocket formed at said distal end.

19. The apparatus according to claim 15, wherein said pocket forms a concave second front face extending from said first front face to a projecting edge at a tip region.

20. The apparatus according to claim 19, further comprising a lower edge forming a lip extending from said base to said projecting edge and a groove being adapted to lift said food part supplied by said first conveyor off of the surface.

21. The apparatus according to claim 15, wherein said first guide and said second guide are adapted to controllably move vertically with respect to a platform.

22. The apparatus according to claim 21, wherein said first guide and said second guide are adapted to be independently elevated and lowered.

23. The apparatus according to claim 21, wherein:
said first guide and said second guide comprises a leading arm, which has a body extending from a base at a proximal end to a projecting edge at a tip region at a distal end forming a pocket therebetween, and
a trailing arm, which has a body extending from a base at a proximal end to a projecting edge at a distal end, with a pocket formed therebetween.

24. The apparatus according to claim 23, wherein said pocket of said trailing arm and said pocket of said leading arm form a capture zone for said food part.

25. The apparatus according to claim 15, wherein said first guide is adapted to controllably move food parts by rotating said first guide, and said second guide is adapted to controllably move said food parts by rotating said second guide.

26. A method for grading and batching of food parts, comprising the steps of:
sequentially transporting food parts with at least a first conveyor;
operably controlling a pivoted first guide by a first actuator to controllably move said food parts supplied by said first conveyor onto a static scale of a weighing station;
weighing said food parts with said weighing station and associating each of the determined weights with the corresponding food part, said weighing station positioned downstream of the first conveyor;
operably controlling a pivoted second guide by a second actuator to controllably move said food parts from said static scale onto a discharge conveyor after weighing;
sequentially transporting the weighed food parts from said weighing station to a plurality of controllable transfer units with said discharge conveyor;
selectively transferring particular ones of said food parts, which have been weighed, from said discharge conveyor into a selected one of a plurality of batch bins with the plurality of controllable transfer units, each of which is associated with one of said batch bins; and
controlling said transfer unit in order to assemble in each of said bins a plurality of said food parts to such an extent that the total weight of said food parts collected in each of said batch bins corresponds to a predetermined target weight.

27. The method according to claim 26, wherein a direction of rotation of said first guide is in accordance with a direction of conveyance of said food parts supplied by said first conveyor.

28. The method according to claim 26, wherein said first guide and said second guide controllably move vertically with respect to a platform.

29. The method according to claim 28, wherein said first guide and said second guide are independently elevated and lowered.

30. The method according to claim 26, wherein said first guide is adapted to controllably move food parts supplied by said first conveyor onto said scale by rotating said first guide, and said second guide is adapted to controllably move said food parts from said scale onto said discharge conveyor by rotating said second guide.

31. The method according to claim 26, wherein a direction of rotation of said first guide is in accordance with a direction of conveyance of said food parts supplied by said first conveyor and/or a direction of rotation of said second guide is in accordance with a direction of conveyance of said food parts transported by said discharge conveyor.

* * * * *